(12) United States Patent
Levine et al.

(10) Patent No.: US 7,266,761 B2
(45) Date of Patent: Sep. 4, 2007

(54) SPECIAL API INTERFACE FOR INTERFACING AN APPLICATION WITH A TWAIN MODULE, NEGOTIATING AND PRESENTING A USER INTERFACE FOR INSERTING AN IMAGE INTO A DOCUMENT

(75) Inventors: Rebecca S. Levine, Campbell, CA (US); Cameron R. Turner, Seattle, WA (US); Brian Frohlich, Poway, CA (US); Peter Wu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,821

(22) Filed: Jun. 15, 1999

(65) Prior Publication Data
US 2003/0177448 A1    Sep. 18, 2003

(51) Int. Cl.
*G06F 15/00* (2006.01)
(52) U.S. Cl. ............... 715/500; 358/474; 358/505; 382/312
(58) Field of Classification Search ............ 707/500, 707/517, 530, 515; 382/259, 256, 288, 254, 382/282, 312–313, 318, 321; 715/500, 517, 715/530, 515; 358/442, 1.1, 1.2, 407–408, 358/401, 505, 474
See application file for complete search history.

(56) References Cited

U.S. PATENT DOCUMENTS

| | | | | |
|---|---|---|---|---|
| 5,588,072 A | * | 12/1996 | Wang | 382/176 |
| 5,596,753 A | * | 1/1997 | Bhatt | 709/320 |
| 5,729,637 A | * | 3/1998 | Nicholson et al. | 382/180 |
| 5,845,076 A | * | 12/1998 | Arakawa | 709/203 |
| 5,907,665 A | * | 5/1999 | Sobol et al. | 358/1.9 |
| 5,915,106 A | * | 6/1999 | Ard | 703/23 |
| 6,003,093 A | * | 12/1999 | Kester | 719/321 |
| 6,028,603 A | * | 2/2000 | Wang et al. | 345/776 |
| 6,094,662 A | * | 7/2000 | Hawes | 707/104.1 |
| 6,154,756 A | * | 11/2000 | Hearn et al. | 707/515 |
| 6,192,149 B1 | * | 2/2001 | Eschbach et al. | 382/162 |
| 6,256,662 B1 | * | 7/2001 | Lo et al. | 709/203 |
| 6,286,054 B2 | * | 9/2001 | Wang | 719/321 |

(Continued)

OTHER PUBLICATIONS

Mastering Photoshop 5 for the Web, Straznitskas, M., Sybex., 1998, pp. 1-10.*

(Continued)

*Primary Examiner*—Cesar Paula
(74) *Attorney, Agent, or Firm*—Workman Nydegger

(57) ABSTRACT

Inserting images into documents. An image source device is made active with an application used to create text in a document. An application programming interface (API) module is accessed from within the application. The API interfaces the application with a TWAIN module used for acquiring an image with the image source device. The API module is separate from the TWAIN module and isolates users from directly interacting with the TWAIN module. The application uses the API module for negotiating with the image source device to determine a set of image capture parameters that control the image source device when acquiring the image. Data representing the image is communicated from the image source device into the memory of a computer hosting the application used to create text so that the data representing the image is a portion of a document stored in the memory.

32 Claims, 10 Drawing Sheets

U.S. PATENT DOCUMENTS

| | | | |
|---|---|---|---|
| 6,370,277 B1* | 4/2002 | Borrey et al. | 382/254 |
| 6,421,468 B1* | 7/2002 | Ratnakar et al. | 382/254 |
| 6,429,952 B1* | 8/2002 | Olbricht | 358/442 |
| 6,587,129 B1* | 7/2003 | Lavendel et al. | 715/776 |
| 7,039,876 B2* | 5/2006 | Lavendel et al. | 715/777 |

OTHER PUBLICATIONS

Troubleshooting and configuring the Windows NT/95 Registry, Johnson C., Sams Pub., 1997, pp. 1-2.*

IBM ADF Color Scanner user's guide, IBM, Jul. 1995, pp. 14-22, and fig. 1-16).*

Camarda et al, "Special Edition Using Microsoft Word 2000", hereinafter Camarda, Jan. 8, 1999,chapter 1, "Creating New Documents", chapter 20, "Inserting Pictures directly, Without Clip Gallery", chapter 29 "Using Powerpoint".*

Corel Wordperfect 6.1, 1996, hereinafter Wordperfect "Scan Images into Wordperfect", and "Scanner Setup" printouts.*

"Ulead PhotoImpact 3.0" User Guide for Windows 95 and Windows NT 3.51, Ulead Systems, 1996, pp. 104-107, 111-114, 162-167.*

Corel Wordperfect 6.1, 1996, "Scan Images into Wordperfect", "Scanner Setup", "Image Settings", and "Image Tools" printou.*

"TWAIN White Paper", 1996, http://www.twain.org, pp. 1-4.*

Mosberger, D., The SANE Scanner Interface, Mar. 1998, Linux Journal.*

Moseberger, D., "The Sane Scanner Interface", Linux Journal, Issue 47, Mar. 1998, pp. 1-12.*

Twain Working Group Committee. Twain: Linking Applications and Images. Vision Statement and Functional Specification. Version 1.7. Sep. 16, 1997, 52pp.

Twain Working Group Committee. Twain: Linking Images with Applications. Twain Specification. Version 1.8. Ratified Oct. 22, 1998, 161pp.

* cited by examiner

SPECIAL API INTERFACE FOR INTERFACING AN APPLICATION WITH A TWAIN MODULE, NEGOTIATING AND PRESENTING A USER INTERFACE FOR INSERTING AN IMAGE INTO A DOCUMENT

FIELD OF THE INVENTION

This invention is generally directed toward acquiring a graphic image with imaging devices such as scanners and digital cameras, and more specifically, to an application program interface (API) for communicating with image acquisition devices to acquire a graphic image.

BACKGROUND OF THE INVENTION

In the early days of desktop publishing, most publications contained only text and simple black and white line drawings that were output to black and white laser printers. However, due to advances in computer hardware and software, business professionals and graphic artists now regularly create and produce complex, full color publications. This near commercial quality work may include black and white, grayscale, and color images, acquired from imaging devices such as desktop and handheld scanners, or digital still and video cameras.

In order to include such images in a document, it is necessary for a software application being used to create the document to acquire image information from an imaging device. Under many conventional schemes, a user must first leave the application program used to create the document, locate and open a hardware driver for the imaging device, set various device options, acquire the image, make any desired modifications to the image, save the image to disk, close the hardware driver, return to the document application, and then locate and insert the image file from disk into the document. This process is both time consuming and tedious. Most business professionals, designers, or publishers would prefer a simpler approach that perhaps offers fewer control options, but is more efficient when all that is needed is to simply acquire an image with an imaging device and insert the image into a document.

In order to overcome some of the limitations associated with these conventional schemes, hardware and software developers began defining their own image acquisition interfaces that were specific to each application in which an image might be acquired. However, writing a separate driver for each imaging device that is desired to be supported by an application is clearly not an optimal solution. Similarly, it doesn't make sense to ask a hardware vendor to write a different driver to interface its imaging device with each different software application. More importantly, users should not have to deal with many unique application/device drivers in order to get their application programs to communicate with imaging devices.

In 1991, a small group of hardware and software developers, lead by such companies as Hewlett Packard Corporation and Canon Corporation, proposed to simplify the image acquisition process through the development of a standard imaging device communication specification. The resulting specification has lead to the development of the TWAIN API and protocol, which enable application program developers to include support for various image acquisition devices without requiring special drivers for each different device and/or application. The TWAIN API and protocol (hereinafter often referred to simply as "TWAIN") is currently the industry standard for implementing the use of image acquisition devices in application programs.

While TWAIN provides substantial benefits, it still has its limitations. For instance, applications that implement TWAIN generally use many built-in features, such as TWAIN's device selection dialog, or built-in dialogs for setting image capture parameters that are written by various vendors who manufacturer imaging devices that support the standard. Oftentimes, a user may desire to simply insert an image using default settings that will be appropriate for most image acquisitions, rather than having to select various settings through the use of dialogs. Thus, it would be desirable to provide means within any application program that will enable a user to capture and insert an image with minimal user input and/or knowledge of imaging device parameters. The TWAIN API is also quite complex, making it difficult for programmers with limited or no TWAIN experience to implement. Thus, it would also be desirable to enable an application program developer to be able to include support for image acquisition devices without requiring the developer to directly write procedure calls to the TWAIN API.

SUMMARY OF THE INVENTION

The present invention addresses the foregoing limitations of TWAIN and other prior art solutions to the problem of acquiring images for insertion in a document or other file by providing a system and associated methods for acquiring images from various imaging devices and inserting these acquired images into application program documents with minimal user interaction. The system augments TWAIN through the use of a special interface module API that allows the developers of various types of applications, including word processors, spreadsheets, and presentation design tools, to easily add the ability to insert images into documents or files that are created by such applications. The API provides means though which an application program can acquire images from any TWAIN compliant image acquisition device. In many instances, an application program developer can include support for TWAIN compliant devices through the use of a single procedure call, without requiring the developer to write any procedure calls to the TWAIN API.

According to a first aspect of the invention, a method for inserting an image into an application program document is provided. The application program is running on a computer that is in communication with one or more image acquisition devices, such as scanners and digital cameras. The image is acquired or provided by an active image acquisition device, which can be a default device or one selected from a list of available devices generated by the system, and inserted into the application program document so that when the document is saved to a file, the captured image comprises a portion of the file. Furthermore, although it may be temporarily saved into a buffer, the captured image is never saved to a permanent file—that is a file that persists after the application program is closed or the computer is shut down during the process that inserts the image into document produced by the application program.

According to a second aspect of the invention, a set of image capture capabilities of the active image acquisition device are determined, and a set of image capture parameters based in part on the determined capabilities is used to capture the image with the active device. The image acquisition device outputs image data corresponding to the captured image, which is then preferably converted into a compressed format, preferably using a "lossy" compression scheme known as the Joint Photographic Experts' Group (JPEG) format. The compressed image data are then inserted as an image into an application program document without requiring the user to separately save the image as a file and then insert the image file into the document. The image data may also be enhanced prior to insertion (and compression) using a color correction scheme and/or a contrast/brightness correction scheme. In addition, the image may be automatically cropped so that only a desired portion of the image data are inserted into the document.

According to another aspect of the invention, the method allows the user to select the image acquisition device through a dialog that contains a drop-down menu control populated with a list of one or more image acquisition devices available to the user, thereby bypassing TWAiN's select source dialog, which is normally required when using TWAiN for acquiring images. The dialog also enables the user to select a predetermined resolution level, corresponding to whether the document is to be primarily viewed in printed form or as an online document (e.g., as a web page).

According to another aspect of the invention, the method provides means for determining whether the selected image acquisition device can perform an automatic image scan. According to a first technique, a determination is made to whether the selected device can control its resolution in an X and Y direction, along with a determination of whether the device's built-in user interface can be bypassed. If the answer to all three of these determinations is true, then the device is deemed to support automatic scanning. According to a second technique, an error flag is set prior to attempting to automatically scan an image. If the automatic scanning is successful, the error flag is cleared; otherwise, the flag remains set. The error flag is stored, preferably in the operating system registry, so that an application program can disable automatic scanning if the error flag corresponding to a selected image acquisition device is set. If it is determined that the selected (or a default) device can perform automatic scanning, then a menu selection in the application program is enabled that allows the user to automatically scan and insert an image using a single action.

According to another aspect of the invention, a method is provided for inserting a plurality of images into an application program document. An image source device dialog, corresponding to the device's built-in TWAIN user interface, is opened by user activation of a "Custom Insert" menu selection. The image source device dialog provides a user interface for selecting a plurality of images to be inserted into the document. The user selects the plurality of images to be inserted, and the image data for each selected image is compressed. The compressed image data are then inserted into the application program as a plurality of images. The plurality of inserted images may be arranged in different layouts, depending on the nature of the application program document into which they are being inserted. For instance, in a word processor application, the images are preferably inserted in a tiled fashion. In a spreadsheet application, the images are preferably inserted as a plurality of cascaded images into the active spreadsheet. In a presentation design application, the images are preferably inserted as a plurality of new slides.

According to yet another aspect of the invention, a system is provided for implementing the methods discussed above. The system comprises a computer that stores an application program in its memory. The computer is connected in communication with an image acquisition device that provides image data output. Also stored in the computer memory are a source driver module for the image acquisition device, and a source manager module. The source driver module provides a communication interface between the image acquisition device and the source manager module. An interface module, stored in the computer memory, is additionally provided, which allows communication between the application program and the source manager module. The interface module comprises an API that allows the application program to easily obtain image data from image acquisition devices and insert such data into an application program document as one or more images. The interface module also provides the ability to perform post-processing enhancement of the image data, and for compressing the image data prior to inserting the image(s).

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is an efficient system and associated method for acquiring images from various imaging devices and inserting these acquired images into application program documents. The system includes an interface module that comprises an API, which enables developers of various types of applications, including word processing, spreadsheet, and presentation design programs, to include support for the acquisition of images from various scanners, digital cameras, and image databases. The interface module API allows an application program to use much of the functionality built into the TWAIN API and protocol without requiring the application program to make any procedure calls to the TWAIN API. However, the interface module API is still heavily dependent on TWAIN. Therefore, in order to more clearly describe how the invention is implemented, it is first necessary to discuss the TWAIN communication specification and explain how TWAIN operates.

The following sections discuss fundamental aspects of TWAIN and techniques for implementing many of TWAIN's features through TWAIN's API Source Manager and Source, including exemplary computer code. It should be understood that the TWAIN communication specification and protocol were developed by others, completely apart from the present invention, and no inventive claim is made thereto in regard to the present invention. However, many of the aspects of the present invention discussed above are accomplished through the use of the invention's novel interface module API, which provides means for implementing TWAIN compliant image acquisition device based on the TWAIN API Source Manager and Source. A discussion of the interface module API and how it uses TWAIN begins with the section entitled "OFFICE 2000™ TWAIN implementation," which immediately follow the sections concerning TWAIN, below.

The TWAIN Communication Specification

The first version of the TWAIN communication specification was created by a small group of software and hardware developers in 1991. TWAIN defines a standard software protocol and an API for communication between software applications and image acquisition devices (also known as data or image "sources"). The current version of the TWAIN specification (version 1.8) was ratified by the TWAIN working group on Oct. 22, 1998. This specification is available from the TWAIN working group, which has a web site address of "www.twain.org." Portions of the current specification are incorporated herein within the following paragraphs, while the remainder of the TWAIN version 1.8 specification is incorporated herein by reference.

Figure 1:
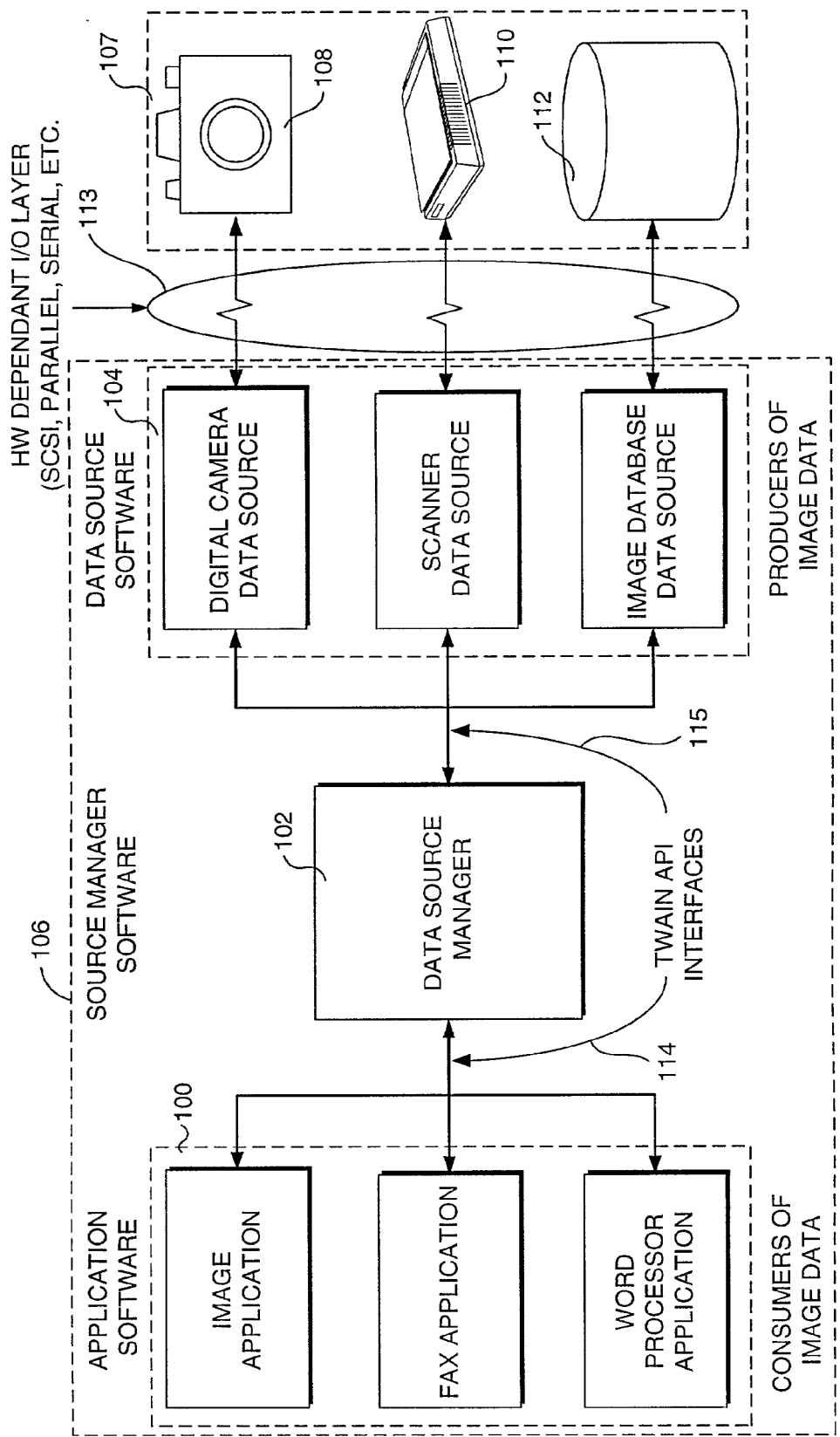
FIG. 1 is a system level schematic block diagram illustrating the primary elements of TWAIN and illustrating how the elements interact when acquiring an image while using the TWAIN communication specification.

The three key elements that comprise TWAIN are shown in FIG. 1. These elements include application software 100 (the application), source manager software 102 (the Source Manager), and data source software 104 (the Source), all of which reside in a computer 106. Various image acquisition devices 107, such as a digital camera 108, a scanner 110, and an image database 112, may be connected to computer 106 via a communication hardware interface 113 that is specific to a particular device. For instance, a scanner may be connected to a computer via a small computer system interface (SCSI), a parallel or serial port, a universal serial bus (USB) port, a "firewire" port (e.g., a port conforming to IEEE Specification 1394), or other types of hardware interfaces. Communication between the application software and image acquisition devices are handled by the Source and the Source Manager via TWAIN APIs 114 and 115.

The Source controls the image acquisition device and is written by the device manufacturer to comply with TWAIN specifications. The Source Manager manages the interactions between the application and the Source. Computer code for implementing the Source Manager is provided in the TWAIN developer's toolkit, and comprises one or more software modules that are preferably stored as part of a computer operating system, or as part of the support code for an application program.

Figure 2:
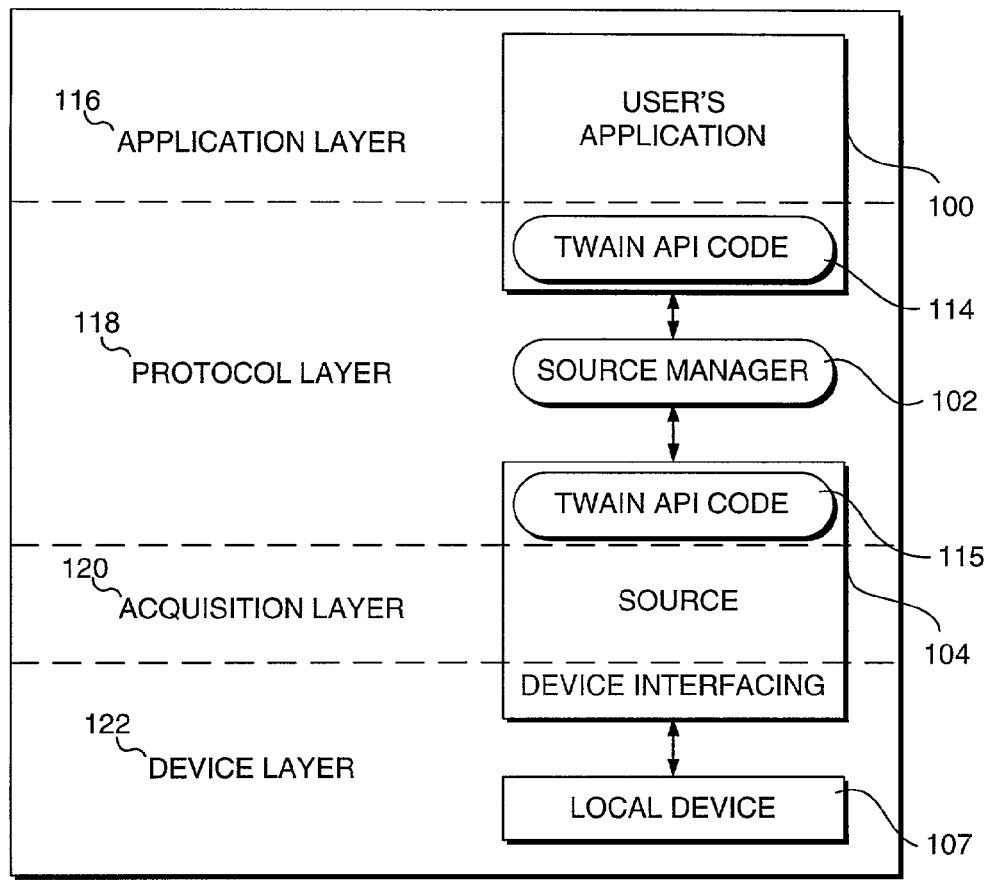
FIG. 2 is a block diagram illustrating the relationship between software elements of TWAIN and the layers these elements occupy under the TWAIN communication specification.

The transfer of data between the application and an image acquisition device is made possible by the three software elements working together in communication under a four-layer architecture, as shown in FIG. 2. The architecture includes an application layer 116, a protocol layer 118, an acquisition layer 120, and a device layer 122.

A user's software application executes in the application layer. The TWAIN specification describes user interface guidelines for the application developer regarding how users should access TWAIN functionality and how a particular Source is selected. TWAIN is not concerned with how the application is implemented, and has no effect on any inter-application communication scheme that the application may use.

TWAIN modules operate at the protocol layer. The protocol is the "language" spoken and syntax used by TWAIN. It implements precise instructions and communications required for the transfer of data. The protocol layer includes: (1) the portion of application software that provides the interface between the application and TWAIN; (2) the TWAIN Source Manager provided by TWAIN; and (3) the software included with the Source device to receive instructions from the Source Manager and transfer back data and return codes.

The acquisition layer comprises acquisition devices, which may be physical (like a scanner or digital camera) or logical (like an image database). The software elements written to control acquisitions are called Sources and reside primarily in this layer. The Source transfers data for the application. It uses the format and transfer mechanism agreed upon by the Source and application. The Source always provides a built-in user interface that controls the device(s) the Source was written to drive. An application can override the provision of the built-in interface and present its own user interface for acquisition, if desired.

The device layer contains the traditional low level device drivers. The device drivers convert device specific commands into hardware commands and actions specific to the particular device the driver was written to accompany. Applications that use TWAIN no longer need to ship device drivers, because they are part of the Source. TWAIN is not concerned with the device layer at all. The Source hides the device layer from the application and provides the translation from TWAIN operations and interactions with the Source's user interface into the equivalent commands for the device driver that cause the device to behave as desired.

Figure 3:
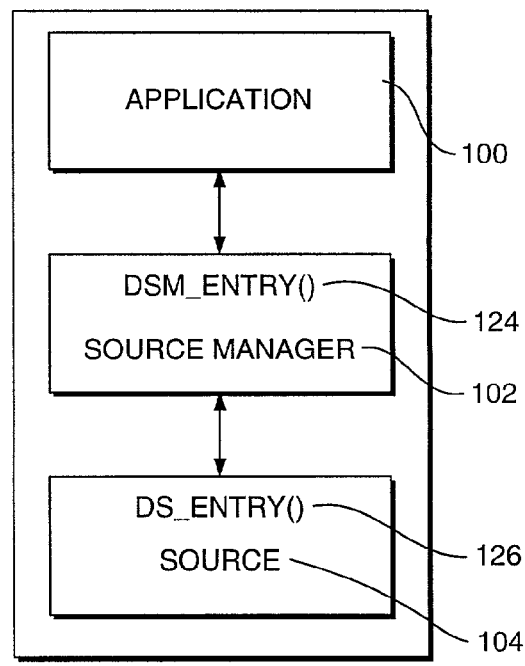
FIG. 3 is a block diagram illustrating the entry points used for communicating between an application element and the source manager and source elements of TWAIN.

As shown in FIG. 3, communication between the TWAIN elements is possible through two entry points: a DSM_Entry( ) function 124 and a DS_Entry( ) function 126. The application communicates with the Source Manager through the Source Manager's only entry point, the DSM_Entry( ) function. The Source Manager communicates with the Source through its DS_Entry( ) function.

The goal of the application in regard to the present invention is to acquire image data from a Source. However, applications cannot contact the Source directly. All requests for data, capability information, error information, etc. must be handled through the Source Manager. Approximately 140 operations are defined by TWAIN. The application sends a request for an operation to the Source Manager and specifies which element, the Source Manager or the Source, is the final destination for each requested operation.

The Source Manager provides the communication path between the application and the Source, supports the user's selection of a Source, and loads the Source for access by the application. Communications from the application to the Source Manager arrive in the DSM_Entry( ) entry point. If the destination in the DSM_Entry call is the Source Manager, the Source Manager processes the operation itself. If the destination in the DSM_Entry call is the Source, the Source Manager translates the parameter list of information, removes the destination parameter and calls the appropriate Source. To reach the Source, the Source Manager calls the Source's DS_Entry( ) function. TWAIN requires each Source to have this entry point.

The DS_Entry function call for the WINDOW™ operating system is as follows:

```
TW_UINT16 FAR PASCAL DS_Entry
    (pTW_IDENTITY pOrigin, // source of message
    TW_UINT32 DG, // data group ID: DG_xxxx
    TW_UINT16 DAT, // data argument type: DAT_xxxx
    TW_UINT16 MSG, // message ID: MSG_xxxx
    TW_MEMREF pData // pointer to data
    );
```

In addition, the Source Manager can initiate three operations that are not originated or requested by the application. These operation "triplets" exist just for Source Manager to Source communications and are executed by the Source Manager while it is displaying its Select Source dialog box. The operations are used to identify the available Sources and to open or close Sources. The Source Manager for WINDOWS is a Dynamic Link Library (DLL), that allows the Source Manager to manage simultaneous sessions between many applications with many Sources (i.e., the same instance of the Source Manager can be shared by multiple applications).

The Use of Operation Triplets

The DSM_Entry( ) and DS_Entry( ) functions are used to communicate operations. An operation is an action that the application or Source Manager invokes. Typically, but not always, these operations involve using data or modifying data that are indicated by the last parameter (pData) in the function call.

Table 1 illustrates the context in which the DSM_Entry( ) and DS_Entry( ) functions are used.

TABLE 1

| From: | To: | Using this function |
|---|---|---|
| The application | The Source Manager | DSM_Entry with the pDest parameter set to NULL |
| The application | The Source (via the Source Manager) | DSM_Entry with the pDest parameter set to point to a valid structure that identifies the Source |
| The Source Manager | The Source | DS_Entry |

The desired action is defined by an operation triplet passed as three parameters in the function call. Each triplet uniquely specifies a particular action. No operation is specified by more than a single triplet. The three parameters that make up the triplet are a Data Group parameter, a Data Argument Type, and a Message ID. Each parameter conveys specific information, as follows.

Data Group (DG_xxxx)

Operations are divided into large categories by the Data Group identifier and include control operations, image operations, and audio operations. The control operations use a DG_CONTROL identifier. These operations involve control of the TWAIN session. An example where DG_CONTROL is used as the Data Group identifier is the operation to open the Source Manager (see below). The image operations use a DG_IMAGE identifier. These operations work with image data. An example where DG_IMAGE is used as a Data Group is an operation that requests the transfer of image data. The audio operations use a DG_AUDIO identifier. These operations work with audio data that are supported by some digital cameras. An example where DG_AUDIO is used as a Data Group is an operation that requests the transfer of audio data.

Data Argument Type (DAT_xxxx)

This parameter of the triplet identifies the type of data that is being passed or operated upon. The argument type may reference a data structure or a variable. There are many data argument types. One example is DAT_IDENTITY. The DAT_IDENTITY type is used to identify a TWAIN element such as a Source.

Recall from above that data are typically passed or modified through the pData parameter of the DSM_Entry and DS_Entry. In this case, the pData parameter would point to a data structure of type TW_IDENTITY. Notice that the data argument type begins with DAT_xxxx and the associated data structure begins with TW_xxxx and duplicates the second part of the name. This pattern is followed consistently for most data argument types and their data structures.

Message ID (MSG_xxxx)

This parameter identifies the action that the application or Source Manager wishes to have taken. There are many different messages such as MSG_GET or MSG_SET, but all begin with a prefix MSG_.

Below are three examples of operation triplets:

The triplet the application sends to the Source Manager to open the Source Manager module is:

DG_CONTROL/DAT_PARENT/MSG_OPENDSM.

The triplet that the application sends to instruct the Source Manager to display its Select Source dialog box and thus allow the user to select the Source from which data will be obtained is:

DG_CONTROL/DAT_IDENTITY/MSG_USERSELECT

The triplet the application sends to transfer data from the Source into a file is:

DG_IMAGE/DAT_IMAGEFILEXFER/MSG_GET

The State-Based Protocol

The application, Source Manager, and Source must communicate to manage the acquisition of image data. It is logical that this process must occur in a particular sequence. For example, the application cannot successfully request the transfer of data from a Source before the Source Manager is loaded and prepared to communicate the request.

To ensure the sequence is executed correctly, the TWAIN protocol defines seven states that exist in TWAIN sessions.

A session is the period during which an application is connected to a particular Source via the Source Manager. The period during which the application is connected to the Source Manager is another unique session. At a given point in a session, the TWAIN elements of Source Manager and Source each occupy a particular state. Transitions to a new state are caused by operations requested by the application or Source and can be in a forward or backward direction. Most transitions are single-state transitions. For example, in general, an operation moves the Source Manager from State 1 to State 2. not from State 1 to State 3. (There are situations where a two-state transition may occur, but they are not discussed here).

When viewing the state-based protocol, it is helpful to remember that States 1, 2, and 3 are occupied only by the Source Manager; and that the Source Manager never occupies a state greater than State 3. Conversely, States 4, 5, 6, and 7 are occupied exclusively by Sources. A Source never has a state less than 4 if it is open, and if it is closed, it has no state. If an application uses multiple Sources, each connection is a separate session and each open Source "resides" in its own state without regard for what state the other Sources are in.

Figure 4:
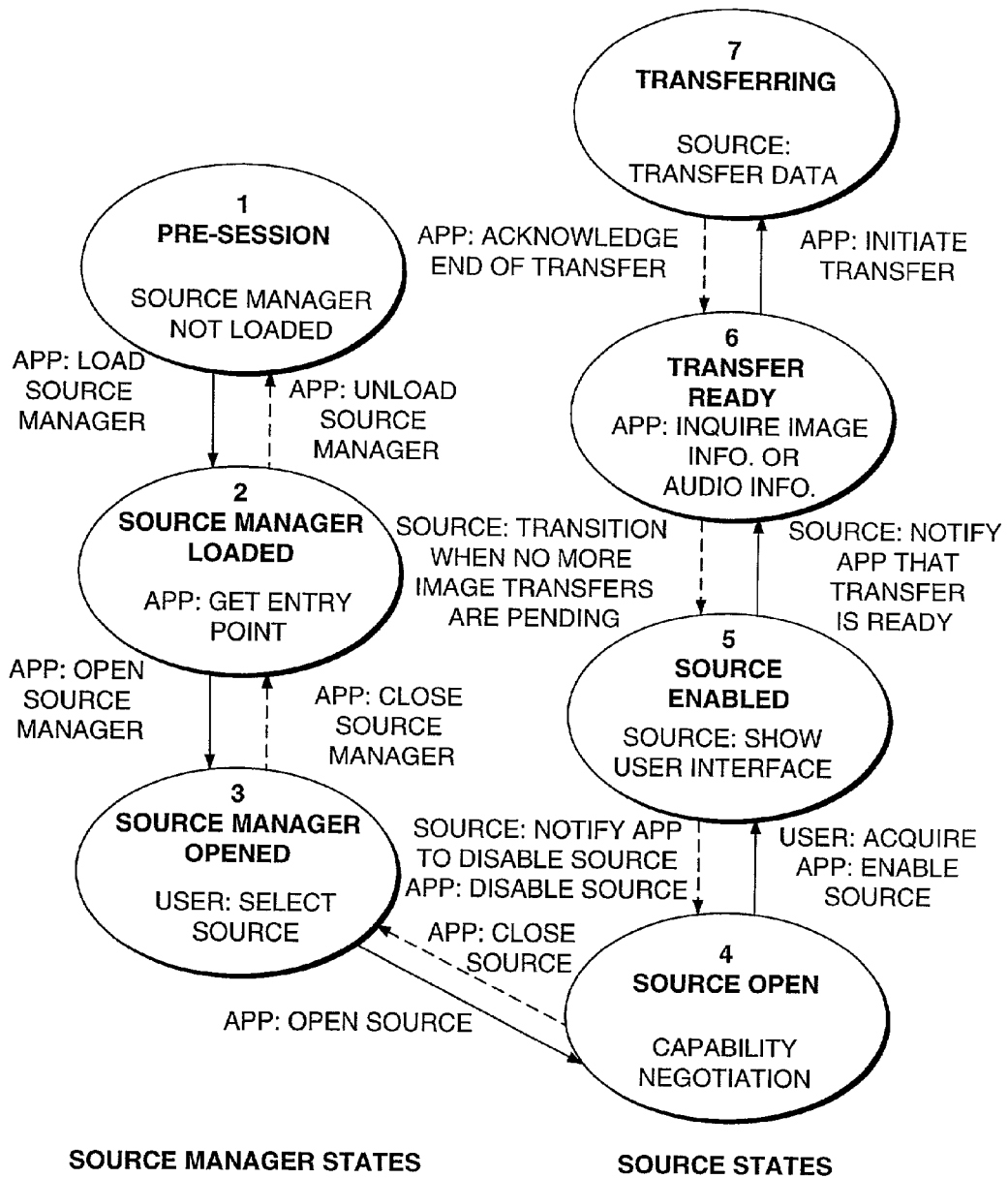
FIG. 4 is a schematic block diagram illustrating the seven states of TWAIN and describing the transitions that occur between these states.

The various states are shown in FIG. 4, and behave as follows.

State 1—Pre-Session

The Source Manager "resides" in State 1 before the application establishes a session with it. At this point, the Source Manager code has been installed on a hard drive or other medium, but typically is not yet loaded into memory. The only case where the Source Manager could already be loaded and running is when another application is already running an instance of the Source Manager DLL. If that situation exists, the Source Manager will be in State 2 or 3 relative to the application that loaded it.

State 2—Source Manager Loaded

The Source Manager is now loaded into memory, but is not yet open. At this time, the Source Manager is prepared to accept other operation triplets from the application.

State 3—Source Manager Open

The Source Manager is open and ready to manage Sources, i.e., to provide lists of Sources, to open Sources, and to close Sources. The Source Manager will remain in State 3 for the remainder of the session until it is closed. The Source Manager refuses to be closed while the application has any Sources open.

State 4—Source Open

The Source has been loaded and opened by the Source Manager in response to an operation from the application and is ready to receive operations. The Source should have verified that sufficient resources exist for it to run (i.e., that sufficient memory is free, the device is available, etc.). The application can inquire about the Source's capabilities (i.e., levels of resolution, support for color or black and white images, automatic document feeder availability, etc.). The application can also set those capabilities to desired settings. For example, using the application, a user may restrict a Source capable of providing color images to transferring only black and white images.

An inquiry about a capability can occur while the Source is in States 4, 5, 6, or 7. But, an application can set a capability only in State 4, unless a special permission is negotiated between the application and Source.

State 5—Source Enabled

The Source has been enabled by an operation from the application via the Source Manager and is ready for user-enabled transfers. If the application has allowed the Source to display its user interface, the Source will do so when it enters State 5.

State 6—Transfer is Ready

The Source is ready to transfer one or more data items (images) to the application. The transition from State 5 to 6 is triggered by the Source notifying the application that the transfer is ready. Before initiating the transfer, the application must acquire information about the image (resolution, image size, etc.). If the Source supports audio, then before transferring the image, the application must transfer all the audio snippets that are associated with the image. It is possible for more than one image to be transferred in succession.

State 7—Transferring

The Source is transferring the image to the application using the transfer mechanism negotiated during State 4. The transfer will either complete successfully or terminate prematurely. The Source sends the appropriate Return Code indicating the outcome. Once the Source indicates that the transfer is completed, the application must acknowledge the end of the transfer.

Modifying an Application to Support TWAIN

In order to implement a TWAIN compliant device in an application, it is necessary to include the TWAIN.H header file that is shipped with this TWAIN Developer's Toolkit. This header file contains all of the critical definitions needed for writing a TWAIN compliant application or Source.

The TWAIN.H header file contains:
Category Prefix for each item
Data Groups DG_
Data Argument Types DAT_
Messages MSG_
Capabilities CAP_, ICAP_, or ACAP_
Return Codes TWRC_
Condition Codes TWCC_
Type Definitions TW_
Structure Definitions TW_
DSM_Entry( ) and DS_Entry( ) entry points In addition, there are many constants defined in TWAIN.H that are not listed here.

It is also necessary to modify the application event loop (i.e., message loop). Events include activities such as key clicks, mouse events, periodic events, accelerators, etc. (On Microsoft Corporation's WINDOWS graphical user interface operating system, these actions are called messages, but TWAIN uses the term "messages" to describe the third parameter of an operation triplet. Therefore, these key clicks, etc. will be referred to as events in this section.) Every TWAIN compliant application needs an event loop.

During a TWAIN session, the application opens one or more Sources. However, even if several Sources are open, the application should only have one Source enabled at any given time, corresponding to the Source from which the user is attempting to acquire image data. Altering the event loop serves three purposes: (1) passing events from the application to the Source so the latter can respond to them; (2) notifying the application when the Source is ready to transfer data or have its user interface disabled; and (3) notifying the application when a device event occurs.

While a Source is enabled, all events are sent to the application's event loop. Some of the events may belong to the application, but others belong to the enabled Source. To ensure that the Source receives and processes its events, the following changes are required:

The application must send all events that it receives in its event loop to the Source as long as the Source is enabled. The application uses the following triplet to perform this function:

DG_CONTROL/DAT_EVENT/MSG_PROCESSEVENT

The TW_EVENT data structure used is as follows:

```
typedef struct {
    TW_MEMREF pEvent; /* Windows pMSG or MAC pEvent */
    TW_UINT16 TWMessage; /* TW message from Source to */
    /* the application */
} TW_EVENT, FAR *pTW_EVENT;
```

The pEvent field points to the message structure.

The Source receives the event from the Source Manager and determines if the event belongs to it. □If it does, the Source processes the event and then sets the Return Code to TWRC_DSEVENT to indicate it was a Source event. In addition, the Source should set the TWMessage field of the TW_EVENT structure to MSG_NULL. If it does not, the Source sets the Return Code to TWRC_NOTDSEVENT, meaning the event is not a Source event. In addition, it should set the TWMessage field of the TW_EVENT structure to MSG_NULL. The application receives this information from DSM_Entry and should process the event in its event loop, as it normally would.

When the Source has data ready for a data transfer or it wishes to request that its user interface be disabled, it needs to communicate this information to the application asynchronously. These notifications appear in the application's event loop. They are contained in the TW_EVENT.TWMessage field. The four notices of interest are:

MSG_XFERREADY to indicate data are ready for transfer;

MSG_CLOSEDSREQ to request that the Source's user interface be disabled;

MSG_CLOSEDSOK to request that the Source's user interface be disabled (a special case for use with DG_CONTROL/DAT_USERINTERFACE/MSG_ENABLEDSUIONLY); and MSG_DEVICEEVENT to report that a device event has occurred.

Therefore, the application's event loop should always check the TW_EVENT.TWMessage field following a DG_CONTROL/DAT_EVENT/MSG_PROCESSEVENT call to determine if it is the simple MSG_NULL or critical MSG_XFERREADY or MSG_CLOSEDSREQ.

The following code illustrates typical modifications needed in a WINDOWS application to support TWAIN connected Sources.

```
TW_EVENT twEvent;
TW_INT16 rc;
while (GetMessage ( (LPMSG) &msg, NULL, 0, 0) )
{
    if Source is enabled
    {
        twEvent.pEvent = (TW_MEMREF)&msg;
        twEvent.TWMessage = MSG_NULL;
        rc = (*pDSM_Entry) (pAppId,
                            pSourceId,
                            DG_CONTROL,
                            DAT_EVENT,
                            MSG_PROCESSEVENT,
                            (TW_MEMREF)&twEvent);
        // check for message from Source
        switch (twEvent.TWMessage)
        {
            case MSG_XFERREADY:
                SetupAndTransferImage (NULL);
                break;
            case MSG_CLOSEDSREQ:
                DisableAndCloseSource (NULL);
                break;
            case MSG_NULL:
                // no message was returned from
                the source break;
        }
        if (rc == TWRC_NOTDSEVENT)
        {
            TranslateMessage( (LPMSG) &msg);
            DispatchMessage( (LPMSG) &msg);
        }
    }
}
```

The DSM_Entry Call and Available Operation Triplets

As described in the Technical Overview chapter of the TWAIN specification, all actions that the application invokes on the Source Manager or Source are routed through the Source Manager. The application passes the request for the action to the Source Manager via the DSM_Entry function call, which contains an operation triplet describing the requested action. In code form, the DSM_Entry function for the WINDOWS graphical user interface operating system is of the following form:

```
TW_UINT16 FAR PASCAL DSM_Entry
    ( pTW_IDENTITY pOrigin, // source of message
      pTW_IDENTITY pDest, // destination of message
      TW_UINT32 DG, // data group ID: DG_xxxx
      TW_UINT16 DAT, // data argument type: DAT_xxxx
      TW_UINT16 MSG, // message ID: MSG_xxxx
      TW_MENREF pData // pointer to data
    );
```

The DG, DAT, and MSG parameters contain the operation triplet. The pOrigin parameter references the application's TW_IDENTITY structure. The contents of this structure must not be changed by the application from the time the connection is made with the Source Manager until it is closed. The pDest parameter should be set to NULL if the operation's final destination is the Source Manager. Otherwise, this parameter should be set to point to a valid TW_IDENTITY structure for an open Source.

DG_xxxx is the Data Group of the operation. Currently, only DG_CONTROL, DG_IMAGE, and DG_AUDIO are defined by TWAIN. Custom Data Groups can be defined.

DAT_xxxx is a designator that uniquely identifies the type of data "object" (structure or variable) referenced by pData.

MSG_xxxx is a message that specifies the action to be taken.

pData refers to the TW_xxxx structure or variable that will be used during the operation. Its type is specified by the DAT_xxxx entry. This parameter should always be typecast to TW_MEMREF when it is being referenced.

Controlling a TWAIN Session from within an Application

Figure 5:
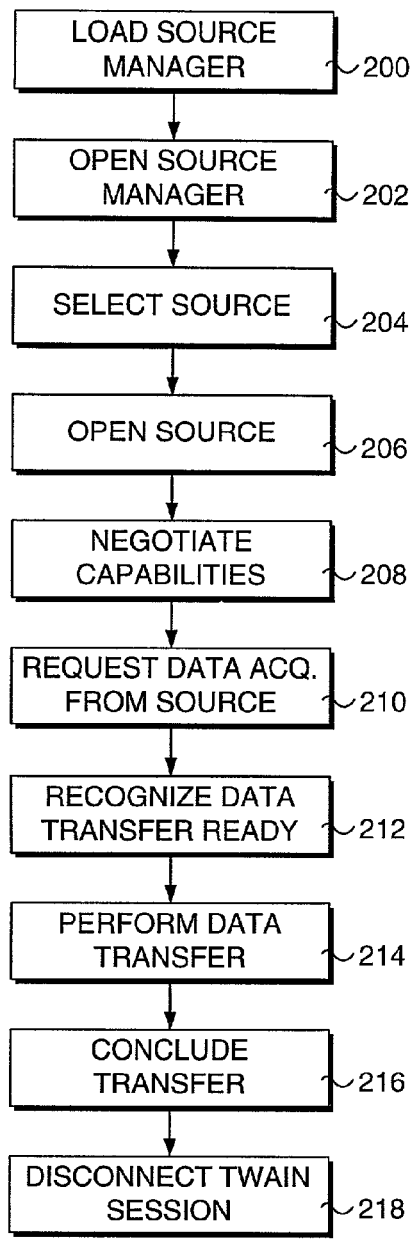
FIG. 5 is a flowchart showing the logical operations performed during a TWAIN session.

FIG. 5 is a flowchart disclosing the logical steps that are preferably used when implementing TWAIN within an application. The process starts in a block 200, which loads the Source Manager and gets the DSM_Entry point, which represents the transition from State 1 to 2. There are no TWAIN operations used for this transition. For a WINDOWS application, the TWAIN.DLL (or TWAIN 32.DLL) is loaded using the LoadLibrary( ) routine. The DSM_Entry can be obtained by using the GetProcAddress( ) call.

Once the Source Manager has been loaded, it must be opened by the application, which occurs in a block 202. The Source Manager is opened by a single triplet operation, DG_CONTROL/DAT_PARENT/MSG_OPENDSM. A WINDOWS application may open the Source Manager by using DSM_Entry, as follows:

```
TW_UINT16 rc;
rc = (*pDSM_Entry) (&AppTD,
                    NULL,
                    DG_CONTROL,
                    DAT_PARENT,
                    MSG_OPENDSM,
                    (TW_MENREF) &hWnd);
```

The pOrigin parameter (&AppID) points to a TW_IDENTITY structure, while the pDest parameter should be set to NULL, and the pData parameter points to the application's main window handle (hWnd). The Source Manager will maintain a copy of this window handle for posting messages back to the application.

The application must allocate a structure of type TW_IDENTITY and fill in all fields except for the ID field. Once the structure is prepared, the pOrigin parameter points at that structure. During the MSG_OPENDSM operation, the Source Manager fills in the ID field with a unique identifier of the application. The value of this identifier is only valid while the application is connected to the Source Manager. The application must save the entire structure. From then on, the structure will be referred to by the pOrigin parameter to identify the application in every call the application makes to DSM_Entry( ).

The TW_IDENTITY structure is defined in the TWAIN.H header file, and looks like this:

```
/* DAT_IDENTITY Identifies the program/library/code
*/
    /* resource. */
        typedef struct {
            TW_UINT32 Id; /* Unique number for
            identification*/
            TW_VERSION Version;
            TW_UINT16 ProtocolMajor;
            TW_UINT16 ProtocolMinor;
            TW_UINT32 SupportedGroups;/*Bit field OR
                combination */
                /*of DG_constants found in */
```

-continued

```
/*the TWAIN.H file */
TW_STR32 Manufacturer;
TW_STR32 ProductFamily;
TW_STR32 ProductName;
} TW_IDENTITY, FAR *pTW_IDENTITY;
```

The following is an example of WINDOWS code that can be used to initialize the application's TW_IDENTITY structure.

```
TW_IDENTITY AppID; // App's identity structure
    AppID.Id = 0; // Initialize to 0 (Source
    Manager
            // will assign real value)
    AppID.Version.MajorNum = 3; //Your app's
    version number
    AppID.Version.MinorNum = 5;
    AppID.Version.Language = TWLG_ENGLISH_USA;
    AppID.Version.Country = TWCY_USA;
    lstrcpy (AppID.Version.Info, "Your App's
        Version String");
    AppID.ProtocolMajor = TWON_PROTOCOLMAJOR;
    AppID.ProtocolMinor = TWON_PROTOCOLMINOR;
    AppID.SupportedGroups = DG_IMAGE | DG_CONTROL;
    lstrcpy (AppID.Manufacturer, "App's
    Manufacturer");
    lstrcpy (AppID.ProductFamily, "App's Product
    Family");
    lstrcpy (AppID.ProductName, "Specific App
        Product Name");
```

At this point, the Source Manager is open and available to assist the application in selection of the desired Source, which occurs in a block 204. This step is performed by a single operation triplet, DG_CONTROL/DAT_IDENTITY/MSG_USERSELECT.

The pOrigin parameter should be set to point to the application's TW_IDENTITY structure. The desired data type should be specified by the application, which was done when the SupportedGroups field was initialized in the application's TW_IDENTITY structure, causing the Source Manager to make available for selection by the user only those Sources that can provide the requested data type(s). All other Sources are grayed out. (Note, if more than one data type were available, for example, image and text, and the application wanted to accept both types of data, it would do a bit-wise OR of the types' constants and place the results into the SupportedGroups field.)

The pDest parameter should be set to NULL.

The pData parameter should be set to point to a structure of type TW_IDENTITY. The application must allocate this structure prior to making the call to DSM_Entry. Once the structure is allocated, the application must set the ID field to zero and set the ProductName field to the null string ("\0"). (If the application wants a specific Source to be highlighted in the Select Source dialog box, other than the system default, it can enter the ProductName of that Source into the ProductName field instead of null. The system default Source and other available Sources can be determined by using the DG_CONTROL/DAT_IDENTITY/MSG_GETDEFAULT, MSG_GETFIRST and MSG_GETNEXT operations.)

Additional fields of the structure are filled in by the Source Manager during this operation to identify the selected Source. The application should keep a copy of this updated structure after completing this call.

The most common approach for selecting the Source is to use the Source Manager's Select Source dialog box. This dialog box is typically displayed when the user clicks on a Select Source option in the application's menu. This process can be accomplished by the following steps.

1. The application sends a DG_CONTROL/DAT_IDENTITY/MSG_USERSELECT operation to the Source Manager to have it display its dialog box. The dialog box includes a list of all Sources that are installed on the system that can provide data of the type specified by the application. The Source that is the system default is highlighted unless the application requests otherwise.

2. The user selects a Source or presses the Cancel button. If no devices are available, the Select Source Dialog's Select/OK button will be grayed out and the user will have no choice but to select Cancel.

3. The application must check the Return Code of DSM_Entry to determine the user's action.
   a. If TWRC_SUCCESS: the selected Source is listed in the TW_IDENTITY structure pointed to by the pData parameter and is now the default Source.
   b. If TWRC_CANCEL: the user either clicked Cancel intentionally or had no other choice because no devices were listed. Do not attempt to open a Source.
   c. If TWRC_FAILURE: use the DG_CONTROL/DAT_STATUS/MSG_GET operation (sent to the Source Manager) to determine the cause of the failure. The most likely cause is insufficient memory.

As an alternative to using the Source Manager's Select Source dialog, the application can provide its own method or dialog box for selecting a Source. For example, the application could simply select a Source without offering the user a choice. Further details relating to creating a user interface that can directly access the Sources connected to the computer on which the application is running are discussed below.

The next step in the process is performed in a block 206, which opens the selected Source. A single triplet operation is used, DG_CONTROL/DAT_IDENTITY/MSG_OPENDS. The pOrigin parameter points to the application's TW_IDENTITY structure. The pDest parameter should be set to NULL.

The pData parameter points to a structure of type TW_IDENTITY. Typically, this parameter points to the application's copy of the Source's TW_IDENTITY structure filled in during the MSG_USERSELECT operation previously performed. However, if the application wishes to have the Source Manager simply open the default Source, it can do this by setting the TW_IDENTYIY.ProductName field to "\0" (null string) and the TW_IDENTITY.Id field to zero.

During the MSG_OPENDS operation, the Source Manager assigns a unique identifier to the Source and records it in the TW_IDENTITY.Id field. The resulting TW_IDENTITY structure should be copied. Once the Source is opened, the application points to this resulting structure via the pDest parameter on every call that the application makes to DSM_Entry, where the desired destination is this Source.

At this point, the application has a structure identifying the open Source. Operations can now be directed from the application to that Source. The next step is performed in a block 208, wherein the capabilities of the Source are negotiated. To receive a single image from the Source, only one capability, CAP_XFERCOUNT, must be negotiated. All other negotiation relating to capabilities is optional.

There are two triplet operations used to negotiate capabilities: DG_CONTROL/DAT_CAPABILITY/MSG_GET and DG_CONTROL/DAT_CAPABILITY/MSG_SET. The pOrigin parameter points to the application's TW_IDENTITY structure, and the pDest parameter points to the desired Source's TW_IDENTITY structure. The Source Manager will receive the DSM_Entry call, recognize that the destination is a Source rather than itself, and pass the operation along to the Source via the DS_Entry function. The pData parameter points to a structure of type TW_CAPABILITY.

The definition of TW_CAPABILITY is:

```
typedef struct {
    TW_UINT16 Cap; /* ID of capability to get or
    set */
    TW_UINT16 ConType; /* TWON_ONEVALUE,
        TWON_RANGE, */
        /* TWON_ENUMERATION or
        TWON_ARRAY */
    TW_HANDLE hContainer; /* Handle to container of
    type */
        /* ConType */
} TW_CAPABILITY, FAR *pTW_CAPABILITY;
```

The Source allocates the container structure pointed to by the hContainer field when called by the MSG_GET operation. The application allocates it when calling with the MSG_SET operation. Regardless of who allocated it, the application deallocates the structure either when the operation is completed or when the application no longer needs to maintain the information.

Since Sources are not required to support all capabilities, the MSG_GET operation can be used to determine if a particular TWAIN defined capability is supported by a Source. The application needs to set the Cap field of the TW_CAPABILITY structure to the identifier representing the capability of interest. The constants identifying each capability are listed in the TWAIN.H file. If the capability is supported and the operation is successful, it returns the Current, Default, and Available values. These values reflect previous MSG_SET operations on the capability, which may have altered them from the TWAIN default values for the capability.

This MSG_GET operation may fail due to several causes. If the capability is not supported by the Source, the Return Code will be TWRC_FAILURE and the condition code will be one of the following:

TWCC_CAPUNSUPPORTED: capability not supported by Source,

TWCC_CAPBADOPERATION: operation not supported by capability, or

TWCC_CAPSEQERROR: capability has dependency on other capability.

Applications should be prepared to receive the condition code TWCC_BADCAP from Sources written prior to TWAIN 1.7, which maps to any of the three situations mentioned above.

The MSG_SET operation changes the current or available value(s) of the specified capability to those requested by the application. The application may choose to set just the capability's current value or it may specify a list of values for the Source to use as the complete set of available values for that capability.

A Source is not required to limit values based on the application's request, although it is strongly recommended that they do so. Thus, certain Sources corresponding to specific hardware devices may not limit capabilities based on an application's request. If the return code indicates TWRC_FAILURE, check the condition code. A code of TWCC_BADVALUE can mean that the application sent an invalid value for this Source's range; (2) the Source does not allow the setting of this capability; and (3) the Source doesn't allow the type of container used by the application to set this capability.

Capability negotiation gives the application developer power to guide the Source and control the images they receive from the Source. The negotiation typically occurs during State 4.

In order to illustrate how capabilities may be negotiated, an example of how to set the capability to specify the number of images the application can transfer is presented below. This example illustrates only one very basic capability and container structure. More specific details concerning capability negotiations are available in Chapter 4 of the TWAIN 1.8 specification.

The capability that specifies how many images an application can receive during a TWAIN session is CAP_XFERCOUNT. All Sources must support this capability. Possible values for CAP_XFERCOUNT are:

TABLE 2

| Value: | Description: |
|---|---|
| 1 | Application wants to receive a single image. |
| greater than 1 | Application wants to receive this specific number of images. |
| −1 | Application can accept any arbitrary number of images during the session. This is the default for this capability. |
| 0 | This value has no legitimate meaning and the application should not set the capability to this value. If a Source receives this value during a MSG_SET operation, it should maintain the Current Value without change and return TWRC_FAILURE and TWCC_BADVALUE. |

The default value allows multiple images to be transferred. The following is a simple code example illustrating the setting of a capability and specifically showing how to limit the number of images to one.

```
TW_CAPABILITY twCapability;
TW_INT16 count;
TW_STATUS twStatus;
TW_UINT16 rc;
pTW_ONEVALUE pval;
//-----Setup for MSG_SET for CAP_XFERCOUNT
twCapability.Cap = CAP_XFERCOUNT;
twCapability.ConType = TWON_ONEVALUE;
twCapability.hContainer = GlobalAlloc (GHND,
sizeof (TW_ONEVALUE));
pval = (pTW_ONEVALUE)
GlobalLock (twCapability.hContainer);
pval->ItemType = TWTY_INT16;
pval->Item = 1; //This app will only accept 1 image
GlobalUnlock (twCapability.hContainer);
//-----Set the CAP_XFERCOUNT
rc = (*pDSM_Entry) (&AppID,
                    &SourceID,
                    DG_CONTROL,
                    DAT_CAPABILITY,
                    MSG_SET,
    (               TW_MEMREF)&twCapability);
GlobalFree( (HANDLE) twContainer.hContainer);
//-----Check Return Codes
//SUCCESS
if (rc == TWRC_SUCCESS)
    //the value was set
//APPROXIMATION MADE
else if (rc == TWRC_CHECKSTATUS)
```

-continued

```
{
    //The value could not be matched exactly
    //MSG_GET to get the new current value
    twCapability.Cap = CAP_XFERCOUNT;
    twCapability.ConType = TWON_DONTCARE16;
    //Source will specify
    twCapability.hContainer = NULL; //Source
    allocates and fills container
    rc = (*pDSM_Entry) (&AppID,
                        &SourceID,
                        DG_CONTROL,
                        DAT_CAPABILITY,
                        MSG_GET,
                        (TW_MEMREF)&twCapability);
    //remember current value
    pval = (pTW_ONEVALUE)
    GlobalLock (twCapability.hContainer);
    count = pval->Item;
    //free hContainer allocated by Source
    GlobalFree ((HANDLE) twCapability.hContainer);
//MSG_SET FAILED
else if (rc == TWRC_FAILURE)
{
    //check Condition Code
    rc = (*pDSM_Entry) (&AppID,
                        &SourceID,
                        DG_CONTROL,
                        DAT_STATUS,
                        MSG_GET,
                        (TW_MEMREF)&twStatus);
    switch (twStatus.ConditionCode)
    {
        TWCC_BADCAP:
        TWCC_CAPUNSUPPORTED:
        TWCC_CAPBADOPERATION:
        TWCC_CAPSEQERROR:
            //Source does not support setting
            this cap
            //All Sources must support
            CAP_XFERCOUNT
            break;
        TWCC_BADDEST:
            //The Source specified by pSourceID
            is not open break;
        TWCC_BADVALUE:
            //The value set was out of range for
            this Source
            //Use MSG_GET to determine what
            setting was made
            //See the TWRC_CHECKSTATUS case
            handled earlier
            break;
        TWCC_SEQERROR:
            //Operation invoked in invalid state
            break;
    }
}
```

After the capabilities of the Source are negotiated, data can be requested to be acquired from the Source. This step is performed in a block 210, where the application enables the Source to show its user interface, if requested, and prepare to acquire data. A single operation triplet is used: DG_CONTROL/DAT_USERINTERFACE/MSG_ENABLEDS. The pOrigin parameter points to the application's TW_IDENTITY structure. The pDest points to the Source's TW_IDENTITY structure. The pData points to a structure of type TW_USERINTERFACE.

The definition of TW_USERINTERFACE is:

```
typedef struct {
    TW_BOOL ShowUI;
    TW_BOOL ModalUI;
    TW_HANDLE hParent;
} TW_USERINTERFACE, FAR *pTW_USERINTERFACE;
```

The ShowUI field should be set to TRUE for the Source to display its user interface. The Source sets the ModalUI field to TRUE if its user interface is modal. If the interface is modeless, the field is set to FALSE. The application sets the hParent field differently, depending on the platform on which the application runs. In the WINDOWS operating system, the application should associate a handle with the Window that is acting as the Source's parent.

In response to the user choosing the application's Acquire menu option to initiate acquisition of an image with a selected Source, the application sends this operation to the Source to enable it. The application typically requests that the Source display the Source's user interface to assist the user in acquiring data. If the Source is told to display its user interface, it displays the user interface when it receives the operation triplet and sets the ModalUI field of the data structure appropriately. Sources must check the ShowUI field and return an error if they cannot support the specified mode. In other words, it is unacceptable for a source to ignore a ShowUI=FALSE request and still activate its user interface. Once the Source is enabled via the DG_CONTROL/DAT_USERINTERFACE/MSG_ENABLEDS operation, all events that enter the application's main event loop must be immediately forwarded to the Source.

The Source is now working with the user to arrange the transfer of the desired data. Unlike all the earlier transitions, the Source, not the application, controls the transition from State 5 to State 6. which is represented by a block 212, wherein a transfer ready signal is provided by the Source. There are no operations from the application that are used. This transition is not triggered by the application sending an operation; instead, the Source causes the transition. It should be recalled that while the Source is enabled, the application is forwarding all events in its event loop to the Source by using the DG_CONTROL/DAT_EVENT/MSG_PROCESSEVENT operation. The TW_EVENT data structure associated is as follows:

```
typedef struct {
    TW_MEMREF pEvent; /*Windows pMSG or MAC pEvent */
    TW_UINT16 TWMessage;/*TW message from the
                         Source to the application*/
} TW_EVENT, FAR *pTW_EVENT;
```

The Source can set the TWMessage field to signal when the Source is ready to transfer data. Following each DG_CONTROL/DAT_EVENT/MSG_PROCESSEVENT operation, the application must check the TWMessage field. If it contains MSG_XFERREADY, the session is in State 6 and the Source will wait for the application to request the actual transfer of data.

If the Source indicates that it is ready, then it is ready to transfer data. This operation is performed by a block 214. At this point, the Source is waiting for the application to inquire about the image details, initiate the actual transfer, and, hence, transition the session from State 6 to 7. If the initiation (DG_IMAGE/DAT_IMAGENATIVEXFER/MSG_GET (see below)) fails, the session does not transition to State 7, but remains in State 6.

Two operation triplets are used in TWAIN, DG_IMAGE/DAT_IMAGEINFO/MSG_GET and DG_IMAGE/DAT_IMAGENATIVEXFER/MSG_GET. For the DG_IMAGE/DAT_IMAGEINFO/MSG_GET operation, the pOrigin parameter points to the application's TW_IDENTITY structure. The pDest points to the Source's TW_IDENTITY structure, and the pData points to a structure of type TW_IMAGEINFO. The definition of TW_IMAGEINFO is:

```
typedef struct {
    TW_FIX32 XResolution;
    TW_FIX32 YResolution;
    TW_INT32 ImageWidth;
    TW_INT32 ImageLength;
    TW_INT16 SamplesPerPixel;
    TW_INT16 BitsPerSample[8];
    TW_INT16 BitsPerPixel;
    TW_BOOL Planar;
    TW_INT16 PixelType;
    TW_UINT32 Compression;
} TW_IMAGEINFO, FAR *pTW_IMAGEINFO;
```

The Source fills in information about the image that is to be transferred. The application uses this operation to get the information regardless of which transfer mode (Native, Disk File, or Buffered Memory) will be used to transfer the data.

For the DG_IMAGE/DAT_IMAGENATIVEXFER/MSG_GET operation, the pOrigin parameter points to the application's TW_IDENTITY structure. The pDest parameter points to the Source's TW_IDENTITY structure, and the pData parameter points to a TW_UINT32 variable. This operation is an exception to the typical pattern. On a WINDOWS application, the pData parameter is a pointer to a handle variable. For a 16-bit WINDOWS environment, the handle is stored in the low word of the 32-bit integer, and the upper word is set to zero. If running under the WIN32™ environment, this handle is a 32-bit window handle. The Source sets pHandle to point to a device independent bitmap (DIB) that it allocates. The application is responsible for deallocating the memory block holding the Native format image.

The application may want to inquire about the image data that it will be receiving, and the DG_IMAGE/DAT_IMAGEINFO/MSG_GET operation allows this inquiry to occur. Other operations, such as DG_IMAGE/DAT_IMAGELAYOUT/MSG_GET, provide additional information, which can be used to determine if the application actually wants to initiate the transfer. To actually transfer the data in the Native mode, the application invokes the DG_IMAGE / DAT_IMAGENATIVEXFER/MSG_GET operation. The Native mode is the default transfer mode and is used unless a different mode was negotiated via the capabilities in State 4. For the Native mode transfer, the application only invokes this operation once per image. The Source returns the TWRC_XFERDONE value when the transfer is complete. This type of transfer cannot be aborted by the application once initiated. (Whether it can be aborted from the Source's user interface depends on the Source.)

The following code provides an exemplary illustration of how to get information about the image that will be transferred and how to actually perform the transfer. This code segment is continued in the following section.

```
// After receiving MSG_XFERREADY
TW_UINT16 TransferNativeImage( )
{
    TW_IMAGEINFO twImageInfo;
    TW_UINT16 rc;
    TW_UINT32 hBitmap;
    TW_BOOL PendingXfers = TRUE;
while (PendingXfers)
{
    rc = (*pDSM_Entry) (&AppId,
            &SourceId,
            DG_IMAGE,
            DAT_IMAGEINFO,
            MSG_GET,
            (TW_MEMREF)&twImageInfo);
if (rc == TWRC_SUCCESS)
    Examine the image information
    // Transfer the image natively
    hBitmap = NULL;
    rc = (*pDSM_Entry) (&AppId,
            SourceId,
            DC_IMAGE,
            DAT_IMAGENATIVEXFER,
            MSG_GET,
            (TW_MEMREF) &HbITMAP);
    // Check the return code
    switch (rc)
    {
        case TWRC_XFERDONE:
// Notes: hBitmap points to a valid image Native
image (DIB or
// PICT)
// The application is now responsible for
deallocating the memory.
// The source is currently in state 7.
// The application must now acknowledge the end of
the transfer,
// determine if other transfers are pending and shut
down the data
// source.
        PendingXfers = DoEndxfer( ); //Function found in
code
                                //example in next
                                section
        break;
        case TWRC_CANCEL:
// The user canceled the transfer.
// hBitmap is an invalid handle but memory was
allocated.
// Application is responsible for deallocating the
memory.
// The source is still in state 7.
// The application must check for pending transfers
and shut down
// the data source.
        PendingXfers = DoEndXfer( ); //Function found in
code
                                //example in next
                                section
        break;
        case TWRC_FAILURE:
// The transfer failed for some reason.
// hBitmap is invalid and no memory was allocated.
// Condition code will contain more information as
to the cause of
// the failure.
// The state transition failed, the source is in
state 6.
// The image data are still pending.
// The application should abort the transfer.
        DoAbortXfer (MSG_RESET); //Function in next
section
        PendingXfers = FALSE;
        break;
    }
}
}
//Check the return code
switch (rc)
```

```
{
    case TWRC_XFERDONE:
        //hBitMap points to a valid Native Image (DIB
or PICT)
        //The application is responsible for
deallocating the memory
        //The source is in State 7
        //Acknowledge the end of the transfer
            goto LABEL_DO_ENDXFER //found in next
        section
        break;
    case TWRC_CANCEL:
        //The user canceled the transfer
        //hBitMap is invalid
        //The source is in State 7
        //Acknowledge the end of the transfer
            goto LABEL_DO_ENDXFER //found in next
        section
        break;
    case TWRC_FAILURE:
        //The transfer failed
        //hBitMap is invalid and no memory was
allocated
        //Check Condition Code for more information
        //The state transition failed, the source is in
State 6
        //The image data are still pending
        //To abort the transfer
            goto LABEL_DO_ENDXFER //found in code
example for
                                //the next section
        break;
}
```

While the transfer occurs, the session is in State 7. When the Source indicates via the Return Code that the transfer is done (TWRC_XHERDONE) or canceled TWRC_CANCEL), the application needs to transition the session backwards. This step is performed in a block 216 using a single operation triplet, DG_CONTROL/DAT_PENDINGXFERS/MSG_ENDXFER. The pOrigin points to the application's TW_IDENTITY structure. The pDest points to the Source's TW_IDENTIFY structure, and the pData points to a structure of type TW_PENDINGXFERS.

The definition of TW_PENDINGXFERS is:

```
typedef struct {
    TW_UINT16 Count;
    TW_UINT32 Reserved;
} TW_PENDINGXFERS, FAR *pTW_PENDINGXFERS;
```

The DG_CONTROL/DAT_PENDINGXFERS/MSG_ENDXFER operation is sent by the application to the Source at the end of every transfer, successful or canceled, to indicate the application has received all the data it expected. After this operation returns, the application should examine the pData->Count field to determine if there are more images waiting to be transferred.

The following code is a continuation of the code example started in the State 6 to 7 section above and illustrates an example of how to the transfer may be concluded.

```
void DoEndxfer( )
{
    TW_PENDINGXFERS twPendingXfers;
    // If the return code from
    DG_IMAGE/DAT_IMAGENATIVEXFER/MSG_GET was
```

-continued

```
// TWRC_CANCEL or TWRC_DONE
// Acknowledge the end of the transfer
rc = (*pDSM_Entry) (&AppId,
                SourceId,
                DG_CONTROL,
                DAT_PENDINGXFERS,
                MSG_ENDXFER,
                (TW_MEMREF)&twPendingXfers)
                ;
if (rc == TWRC_SUCCESS)
{
    // Check for additional pending xfers
    if (twPendingXfers.Count == 0)
    {
            // Source is now in state 5. NOTE THE
            IMPLIED STATE
            // TRANSITION! Disable and close the
            source and
            // return to TransferNativeImage with a
            FALSE notifying
            // it to not attempt further image
            transfers.
            DisableAndCloseDS ( );
            return (FALSE)
    }
    else
    {
            // Source is in state 6 ready to transfer
            another image
            if want to transfer this image
            {
            // returns to the caller,
            TransferNativeImage
            // and allows the next image to transfer
            return TRUE;
            else if want to abort and skip over this
            transfer
            {
                // The current image will be skipped,
                and the
                // next, if exists will be acquired
                by returning
                // to TransferNativeImage
            if (DoAbortXfer(MSG_ENDXFER) > 0)
            return (TRUE);
            else
                    return(FALSE);
            }
        }
    }
}
TW_UINT16 DoAbortXfer(TW_UINT16 AbortType)
{
    rc = (*pDSM_Entry) (&AppId,
                    SourceId,
                    DG_CONTROL,
                    DAT_PENDINGXFERS,
                    MSG_ENDXFER,
                    (TW_MEMREF)&twPendingXfers);
    if (rc == TWRC_SUCCESS)
    {
        // If the next image is to be skipped, but
        subsequent images
        // are still to be acquired, the PendingXfers
        will receive
        // the MSG_ENDXFER, otherwise, PendingXfers
        will receive
        // MSG_RESET.
        rc = (*pDSM_Entry) (&AppId,
                    SourceId,
                    DG_CONTROL,
                    DAT_PENDINGXFERS,
                    AbortType,
                    (TW_MEMREF)&twPendingXfers);
    }
}
//To abort all pending transfers:
LABEL_ABORT_ALL:
```

-continued

```
{
    rc = (*pDSM_Entry) (&AppID,
                &SourceID,
                DG_CONTROL,
                DAT_PENDINGXFERS,
                MSG_RESET,
                (TW_MEMREF)&twPendingXfers);
    if (rc == TWRC_SUCCESS)
        //Source is now in state 5
}
```

Once the application has acquired all desired data from the Source, the application can disconnect the TWAIN session, which is performed in a block 218. To do this, the application transitions the states backwards until the first state is reached. In the previous section, the Source transitioned to State 5 when there were no more images to transfer (TW_PENDINGXFERS.Count=0) or the application called the DG_CONTROL/DAT_PENDINGXFERS/MSG_RESET operation to purge all remaining transfers. To back out the remainder of the session three operations, some platform dependent code is used.

A DG_CONTROL/DAT_USERINTERFACE/MSG_DISABLEDS operation is used to move from State 5 to State 4. The pOrigin parameter points to the application's TW_IDENTITY structure, while the pDest parameter points to the Source's TW_IDENTITY structure. The pData parameter points to a structure of type TW_USERINTERFACE.

The definition of TW_USERINTERFACE is:

```
typedef struct {
                TW_BOOL ShowUI;
                TW_BOOL ModalUT;
                TW_HANDLE hParent;
} TW_USERINTERFACE, FAR *pTW_USERINTERFACE;
```

Its contents are not used.

If the Source's user interface was displayed, this operation causes the Source's user interface to close. The operation is sent by the application in response to a MSG_CLOSEDSREQ from the Source. This request from the Source appears in the TWMessage field of the TW_EVENT structure and is sent back from the DG_CONTROL/DAT_EVENT/MSG_PROCESSEVENT operation used by the application to send events.

If the application did not have the Source's user interface displayed, the application invokes this command when all transfers have been completed. In addition, the application could invoke this operation to transition back to State 4 if it wanted to modify one or more of the capability settings before acquiring more data.

To move from State 4 to State 3, the DG_CONTROL/DAT_IDENTITY/MSG_CLOSEDS operation triplet is used. The pOrigin parameter points to the application's TW_IDENTITY structure. At this point, the pDest parameter should reference a NULL value (indicates destination is Source Manager). The pData points to a structure of type TW_IDENTITY, which is the same TW_IDENTITY structure that is used throughout the session to direct operation triplets to this Source.

When this operation is completed, the Source is closed. In a more complicated scenario, if the application had more than one Source open, it must close them all before closing the Source Manager. Once all Sources are closed and the application does not plan to initiate any other TWAIN session with another Source, the Source Manager should be closed by the application.

To move from State 3 to State 2, a DG_CONTROL/DAT_PARENT/MSG_CLOSEDSM operation triplet is used. The pOrigin parameter points to the application's TW_IDENTITY structure, and the pDest parameter should reference a NULL value (indicates destination is Source Manager). On the WINDOWS graphical user interface operating system, the pData parameter points to the window handle (hWnd) that acted as the Source's "parent." The variable is of type TW_INT 32. For 16-bit WINDOWS, the handle is stored in the lower word of the 32-bit integer, and the upper word is set to zero. If running under the WIN32 environment, this is a 32-bit window handle.

Once the Source Manager has been closed, the application must unload the DLL from memory before continuing. This step can be done in WINDOWS by using FreeLibrary (hDSMLib), where hDSMLib is the handle to the Source Manager DLL returned from the call to LoadLibrary( ) discussed above.

A summary of the simplest view of an application's TWAIN flow is shown below in TABLE 3. All TWAIN actions are initiated by a TWAIN command, either user initiated (Select Source and Acquire) or notification from the Source (MSG_XFERREADY and MSG_CLOSEDSREQ).

tions discussed above. The MSOTW9.DLL API module supports communication between the application and TWAIN. The TWAIN.DLL API module communicates with one or more image acquisition devices 306 through one or more driver.ds modules 308, which contain the code for performing the Source functions discussed above. Alternately, a plurality of Source drivers may be stored in one or more DLL files.

The driver.ds modules are hardware drivers that are specifically written to support a particular image acquisition device, or a particular set of devices. These driver modules are written so that they perform at least a minimum level of features defined by TWAIN, allowing a particular device for which the driver is written, to support any TWAIN compliant application program. For instance, Hewlett Packard Corporation manufacturers several scanners that have associated driver.ds files, which enable the use of such scanners in any application that is designed to support TWAIN compliant devices.

The MSOTW9.DLL API module allows an application program to implement various features of TWAIN by providing an API that comprises a single entry point. In this way, it is not necessary for the application program to call any of the TWAIN calls available through the TWAIN.DLL API. The MSOTW9.DLL module also handles the necessary changes to the application's event loop, as discussed above, without requiring the event loop within the application to be altered. Furthermore, the MSOTW9.DLL API module pro-

TABLE 3

| Application Receives | State | Application Action |
|---|---|---|
| Select Source . . . | 1 -> 2 | Load Source Manager |
| | 2 -> 3 | DG_CONTROL/DAT_PARENT/MSG_OPENDSM |
| | | DG_CONTROL/DAT_DENTITY/MSG_USERSELECT |
| | 3 -> 2 | DG_CONTROL/DAT_PARENT/MSG_CLOSEDSM |
| | 2 -> 1 | Unload Source Manager |
| Acquire . . . | 1 -> 2 | Load Source Manager |
| | 2 -> 3 | DG_CONTROL/DAT_PARENT/MSG_OPENDSM |
| | 3 -> 4 | DG_CONTROL/DAT_IDENTITY/MSG_OPENDS |
| | | Capability Negotiation |
| | 4 -> 5 | DG_CONTROL/DAT_USERINTERFACE/MSG_ENABLEDS |
| MSG_XFERREADY | 6 | For each pending transfer: |
| | | DG_IMAGE/DAT_IMAGEINFO/MSG_GET |
| | | DG_IMAGE/DAT_IMAGELAYOUT/MSG_GET |
| | | DG_CONTROL/DAT_CAPABILITY/MSG_GETCURRENT |
| | 6 -> 7 | DG_IMAGE/DAT_IMAGExxxxXFER/MSG_GET |
| | 7 -> 6 | DG_CONTROL/DAT_PENDINGXFERS/MSG_ENDXFER |
| | 6 -> 5 | Automatic transition to State 5 if TW_PENDINGXFERS.Count equals 0. |
| MSG_CLOSEDSREQ | 5 -> 4 | DG_CONTROL/DAT_USERINTERFACE/ MSG_DISABLEDS |
| | 4 -> 3 | DG_CONTROL/DAT_IDENTITY/MSG_CLOSEDS |
| | 3 -> 2 | DG_CONTROL/DAT_PARENT/MSG_CLOSEDSM |
| | 2 -> 1 | Unload the Source Manager |

OFFICE 2000 TWAIN Implementation

Figure 6:
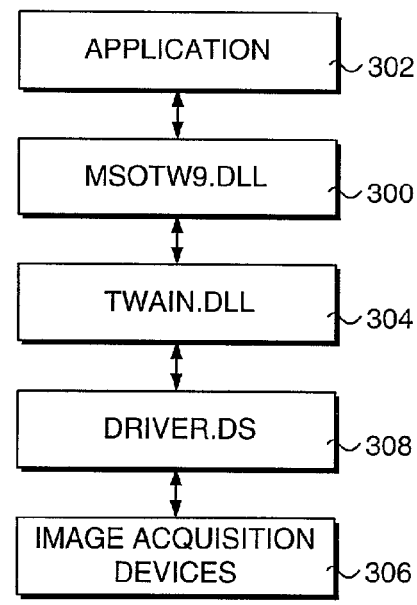
FIG. 6 is a system level block diagram illustrating the components that an exemplary application program implementation of the present invention uses when acquiring an image from a TWAIN image acquisition device.

Details that are more specific to a preferred embodiment of the present invention, as implemented in Microsoft Corporation's OFFICE 2000™, are discussed in this section. The OFFICE 2000 product comprises a suite of application programs that share various resources, including DLLs. In regard to the present invention, OFFICE 2000 enables its application programs to acquire and insert images from TWAIN compliant image acquisition devices through a special dynamic link library API module, called MSOTW 9.DLL. As shown in FIG. 6, MSOTW9.DLL API module 300 resides between an application 302 and a TWAIN.DLL API module 304, which handles the Source Manager funcvides functionality that is not directly available from the TWAIN.DLL API module, such as generating drop-down menu structures comprising a list of available image acquisition devices and verifying whether an image acquisition device can actually support automatic scanning.

In order to implement the features of the invention in accord with one preferred embodiment, it is necessary to install the MSOTW9.DLL API module, the TWAIN.DLL API module, and appropriate device driver files and/or libraries on a computer. Both the WINDOWS98™ and WINDOWS NT™ operating systems can be installed with all the necessary TWAIN modules during their initial installation, or during a subsequent update. In addition to the TWAIN.DLL module, it may be necessary to install a TWAIN_32.DLL module, along with TWUNK_16. EXE and TWUNK_32. EXE files. The TWUNK files allow a programs and/or drivers written for a 16-bit environment to operate in a 32-bit environment.

One of the objectives of the MSOTW9.DLL API module is to allow an application to automatically scan an image and insert the image into a document with minimal user input. Typically, in order to perform a scan under the prior art, it is necessary to invoke the TWAIN Source Manager select source dialog to select a device, and then to invoke a TWAIN compliant user interface for the selected image acquisition device that is provided by the manufacturer of the device, through the driver.ds file. This user interface commonly comprises one or more dialogs that contain various parameters that must be set in order to obtain an image. Although the use of such an interface allows specific capabilities and parameters to be set, it is often the case that a set of default parameters can be used to obtain acceptable results, in a much simpler fashion.

In order to scan an image under the present invention, it is also necessary to select an available image acquisition device (even if only confirming a default image acquisition device). The MSOTW9.DLL API allows an application program user to select an available data acquisition device without having to use the normal TWAIN Source Manager Select Source dialog. The MSOTW9.DLL API provides a dialog (upon selection of an "Acquire Image" menu item in the application) that includes a drop-down list box, which is used for selecting an active image acquisition device from among a list of devices that is automatically generated by the API.

Figure 7:
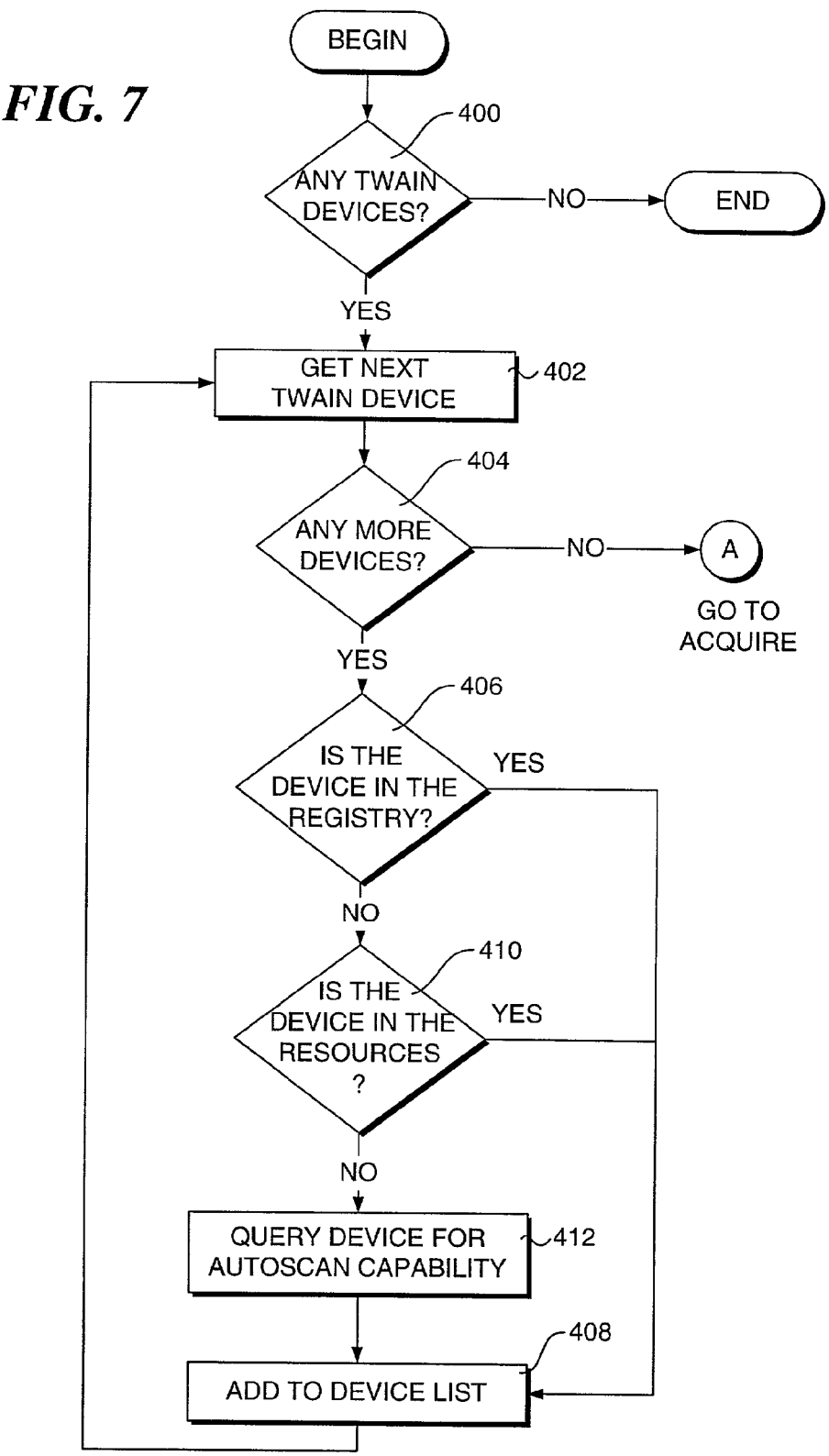
FIG. 7 is a flowchart illustrating the logic used when compiling a list of available image acquisition devices.

The process for generating the list of available image acquisition devices is illustrated by the flowchart shown in FIG. 7. The process begins with a decision block 400, which invokes a TWAIN API call to determine if any TWAIN compliant image acquisition devices (TWAIN devices) are available for use (i.e., connected to the computer and operating). If the answer to the query is yes, then a TWAIN API procedure call is made in a block 402 to get the next (starting with a first) TWAIN device, as follows:

//Get next Twain Device

TWAIN_Entry(DAT_IDENTITY, MSG_GETNEXT,
 (TW_MEMREF)&SourceID);

This TWAIN API call returns a pointer to a Source identifier (&SourceID). The TWAIN API call also performs the function of a decision block 404, which queries to see if there are any more TWAIN devices. If the answer is no, then identification of the available TWAIN devices to be listed is completed.

For each of the identified TWAIN devices, a first query is made in a decision block 406 to see if the device is listed in the operating system registry. If the device is listed, then various capabilities of the device (that are stored in the registry) are retrieved from the registry, and the process proceeds to a block 408. If the device is not listed in the registry, then a second query is made in a decision block 410 to determine if the device is listed in the MSOTW9.DLL resources (see below). If the device is listed in these resources, then various capabilities of the device are retrieved from the resources, and the process proceeds to block 408. If the answer to both of the queries in blocks 408 and 410 is no, then a determination is made to ascertain whether the device can support automatic scanning (autoscanning) in a block 412 (see below), whereupon the process proceeds to block 408.

In block 408, the TWAIN device is added to a list of available TWAIN devices, which includes the identity of the device, along with an indication of whether it supports autoscanning. The process returns to block 402, where the previous steps are repeated until the answer to decision block 404 is no (i.e., there are no more devices to get).

Figure 8:
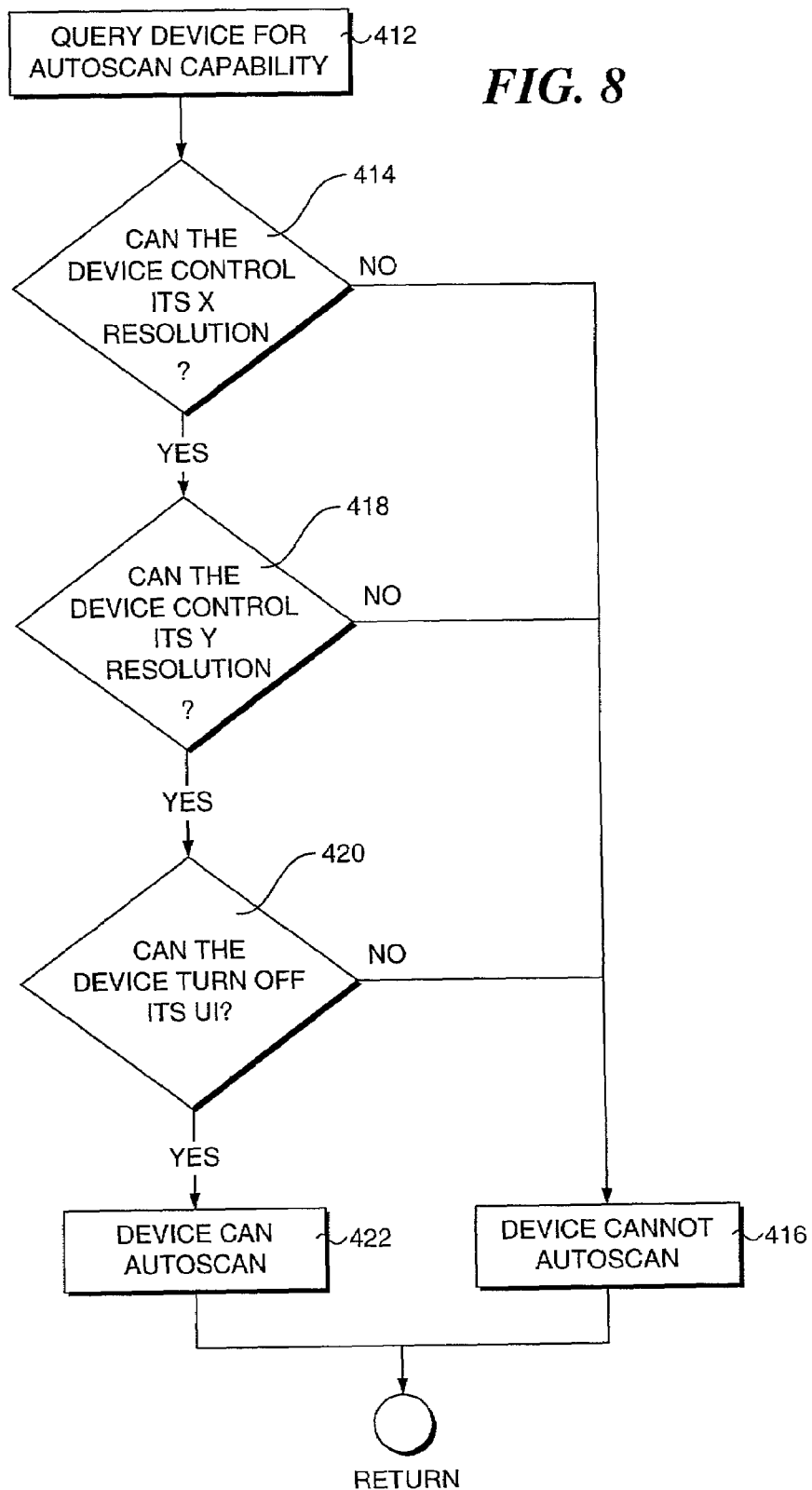
FIG. 8 is a flowchart illustrating the logic used when determining whether an image acquisition device can support automatic scanning.

The process for determining whether a device has the capability to perform an autoscan is illustrated by the flowchart shown in FIG. 8. An autoscan capable device can perform a scan and produce an image without requiring the user to enter the device's user interface, thereby allowing an application program to request the device to scan using a minimum amount of user input. Under some circumstance, this may require only a single user action after an initial "AcquireImage" menu item selection.

The process begins in a decision block 414, where a query is made to determine if the device can control its resolution in the X direction, using the following code:

```
// Check if device can alter its X Resolution
m_twCapability.Cap = ICAP_XRESOLUTION;
m_twCapability.ConType = TWON_DONTCARE16;
m_twCapability.hContainer = NULL;
TWAIN_Entry(DAT_CAPABILITY, MSG_GET,
        (TW_MEMREF)&m_twCapability, &m_SourceID);
```

If the device cannot control its resolution in the X direction, then the logic proceeds to a block 416, which provides a return parameter indicating that the device cannot autoscan.

If the device can control its resolution in the X direction, then the logic proceeds to a decision block 418, where a query is made to determine if the device can control its resolution in the Y direction, using the following code:

```
// Check if device can alter its Y Resolution
m_twCapability.Cap = ICAP_YRESOLUTION;
m_twCapability.ConType = TWON_DONTCARE16;
m_twCapability.hContainer = NULL;
TWAIN_Entry(DAT_CAPABILITY, MSG_GET,
        (TW_MEMREF)&m_twCapability, &m_SourceID);
```

If the device cannot control its resolution in the Y direction, then the logic proceeds to block 416, which provides a return parameter indicating that the device cannot autoscan.

If the device can control its resolution in both the X and Y directions, the logic proceeds to a decision block 420, where a query is made to determine if the device can turn its user interface off. In order to autoscan, the application must be able to bypass the built-in user interface for a device. The following code is used for this query:

```
// Check if device can turn off its UI.
m_twCapability.Cap = CAP_UICONTROLLABLE;
m_twCapability.ConType = TWON_DONTCARE16;
m_twCapability.hContainer = NULL;
TWAIN_Entry(  DAT_CAPABILITY,  MSG_GET,
        (TW_MEMREF)&m_twCapability, &m_SourceID);
```

If the device cannot turn off its user interface, then the logic proceeds to block 416, which provides a return parameter indicating that the device cannot autoscan. If the device can turn off its user interface, then the logic proceeds to a block 422, which provides a return parameter indicating that the device can autoscan.

Bypassing the Source User Interface

In addition to bypassing the Source Manager's Select Source dialog, the application may desire to bypass the Source's user interface. As discussed above, this is a necessary capability for performing an autoscan.

To enable the Source without displaying its user interface, the DG_CONTROL/DAT_USERINTERFACE/MSG_ENABLEDS operation is used. The ShowUI field of the TW_USERINTERFACE structure is set to FALSE.

When the command is received and accepted (TWRC_SUCCESS), the Source does not display a user interface, but is armed to begin capturing data. For example, in a flatbed scanner, the light bar is energized and begins to move. A handheld scanner is armed and ready to acquire data when the "go" button is pressed on the scanner. Other devices may respond differently, but all will either begin acquisition immediately or be armed to begin acquiring data as soon as the user interacts with the device appropriately.

It is essential that capability negotiation used with the Source's user interface be bypassed. Since the Source's user interface is not displayed, the user will have no means for setting various image capture parameters. Unless default values are acceptable, current values for all image acquisition and control parameters must be negotiated before the Source is enabled, i.e., while the session is in State 4.

When TW_USERINTERFACE.ShowUI is set to FALSE, the application is still required to pass all events to the Source (via the DG_CONTROL/DAT_EVENT/MSG_PROCESSEVENT operation) while the Source is enabled. The Source must display the minimum possible user interface containing only those controls required to make the device useful in context. In general, this means that no user interface is displayed; however, certain devices may still require a trigger to initiate the scan. By default, the Source still displays a progress indicator during the acquisition. The application can suppress this display by setting CAP_INDICATORS to FALSE, if the Source allows that option.

The Source still displays errors and other messages related to the operation of its device, since these functions cannot be disabled. The Source still sends the application a MSG_XFERREADY notice when the data are ready to be transferred. The Source may or may not send a MSG_CLOSEDSREQ to the application asking to be closed, since this message is often user initiated. Therefore, after the Source has returned to State 5 (following the DG_CONTROL/DAT_PENDINGXFERS/MSG_ENDXFER operation and the TW_PENDINGXFERS.Count=0), the application can send the DG_CONTROL/DAT_USERINTERFACE/MSG_DISABLED operation.

It should be noted that some Sources may display their user interface even when ShowUI is set to FALSE. An application can determine whether ShowUI can be set by interrogating the CAP_UNCONTROLLABLE capability. If CAP_UNCONTROLLABLE returns FALSE, but the ShowUI input value is set to FALSE in an activation of DG_CONTROL/DAT_USERINTERFACE/MSG_ENABLEDS, the enable DS operation returns TWRC_CHECKSTATUS and displays the UI regardless. Therefore, an application that requires that the UI be disabled should interrogate CAP_UNCONTROLLABLE before issuing MSG_ENABLEDS.

Figure 9:
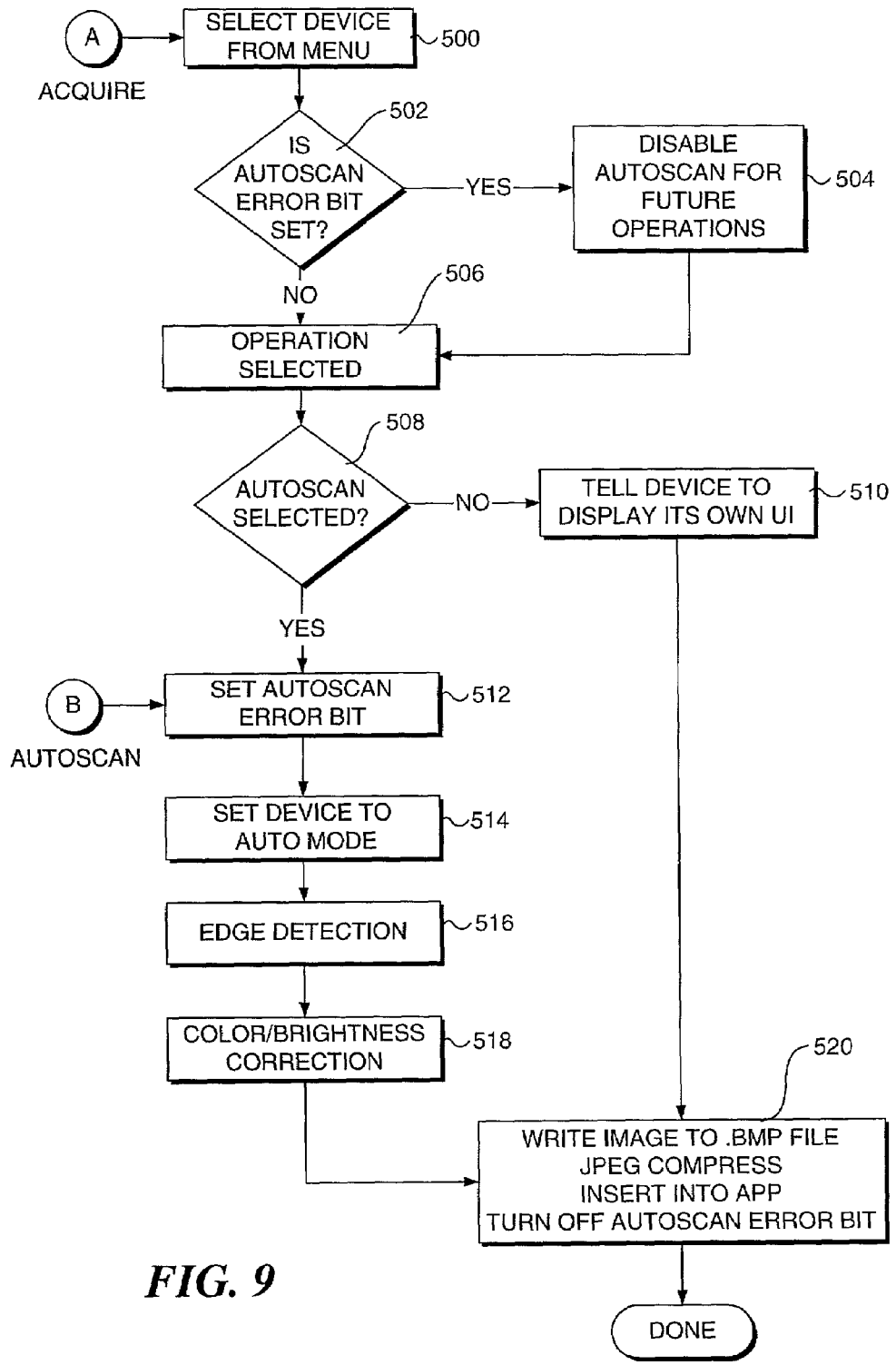
FIG. 9 is a flowchart illustrating the logic used when acquiring an image with a TWAIN image acquisition device.

FIG. 9 includes a flowchart illustrating the logic used when acquiring an image. The process starts in a block 500, where a user selects a device from a drop-down menu. The drop-down menu is generated from this list of available TWAIN devices found above (FIG. 7).

After a device is selected by the user, the registry is checked to see if the autoscan error bit is set for the chosen device in a decision block 502. The autoscan error bit is used to inform the application whether or not the selected device can be used for autoscanning. If the autoscan error bit is set, a block 504 disables the application from performing autoscanning during future operations.

The logic next proceeds to a block 506, where the user selects the scanning operation that is to be performed. The user is presented with an "Insert" option and a "Custom Insert" option, in a preferred embodiment. The "Custom Insert" option is selected when the user wants to control image capture parameters, such as image resolution, special cropping, etc. The "Insert" option is selected when the user desires to automatically scan and insert (autoscan) an image without requiring any additional settings be selected.

A decision block 508 determines if the "Insert" (autoscan) option is selected. If this option was not selected, TWAIN's normal image acquisition process is used, beginning in a block 510, which displays the selected device's built-in user interface. The user can then select various image capture parameters to control capture of the image. Display of the built-in user interface is performed with the following code:

```
// Tell device to turn on its UI
m_twUI.ShowUI = TRUE;
TWAIN_Entry(DAT_USERINTERFACE, MSG_ENABLEDS,
    TW_MEMREF)&m_twUI, &m_SourceID);
```

If automatic insert is selected, the logic proceeds to a block 512, where an autoscan error flag is set in the registry. The autoscan error flag is separate from and in addition to the autoscan error bit discussed above, and is used to identify whether or not the device supports autoscanning through an attempted use of the device for autoscanning. With reference to FIG. 8 and the discussion above, if the answer to any of the queries in decision blocks 414, 418, or 420 is no, the device is not capable of autoscanning. However, there are some instances where the answer to all of these queries for a given device will be yes (true), even though the device is not capable of performing an autoscan. This is the reason for setting the autoscan error flag here. If the autoscan operations discussed below are successful, the autoscan error flag will be cleared, and autoscanning of the device will be confirmed. In contrast, unsuccessful performance of these operations indicates that the device cannot perform an autoscan, so the autoscan error flag remains set in the registry. For instance, if the application program locks up due to an error during an attempted autoscan, the flag will not be cleared. During the next attempted use of the device, the system will recognize that the error flag is set, whereupon it will change the error bit in the registry to reflect that the device cannot perform autoscanning. As discussed above, this error bit informs the API module that the device cannot perform an autoscan, thereby disabling autoscanning and any associated dialog buttons during future operations with the device.

After the autoscan error flag is set, the device is set to an automatic mode in a block 514 by the following code:

```
// Set up for AutoScan
// Set selected X resolution
twCapability.Cap = ICAP_XRESOLUTION;
twCapability.ConType = TWON_ONEVALUE;
twCapability.hContainer = GlobalAlloc (GHND, sizeof
(TW_ONEVALUE));
ptwOneValue = (pTW_ONEVALUE) GlobalLock
(twCapability.hContainer)
ptwOneValue->ItemType = TWTY_FIX32;
ptwOneValue->Item = XRes;
TWAIN_Entry( DAT_CAPABILITY, MSG_SET,
       (TW_MEMREF)&twCapability, &m_SourceID);
// Set selected Y resolution
twCapability.Cap = ICAP_YRESOLUTION;
twCapability.ConType = TWON_ONEVALUE;
twCapability.hContainer = GlobalAlloc (GHND, sizeof
(TW_ONEVALUE));
ptwOneValue = (pTW_ONEVALUE) GlobalLock
(twCapability.hContainer)
ptwOneValue->ItemType = TWTY_FIX32;
ptwOneValue->Item = YRes;
TWAIN_Entry( DAT_CAPABILITY, MSG_SET,
      (TW_MEMREF)&twCapability, &m_SourceID);
// Find maximum scan size and set to do it.
TWAIN_Entry( DAT_IMAGELAYOUT, MSG_GET,
(TW_MEMREF)&twImageLayout, &m_SourceID, DG_IMAGE);
TWAIN_Entry( DAT_IMAGELAYOUT, MSG_SET,
(TW_MEMREF)&twImageLayout, &m_SourceID, DG_IMAGE);
// Set pixels to RGB
twCapability.Cap = ICAP_PIXELTYPE;
twCapability.ConType = TWON_ONEVALUE;
twCapability.hContainer = GlobalAlloc (GHND, sizeof
(TW_ONEVALUE));
ptwOneValue = (pTW_ONEVALUE) GlobalLock
(twCapability.hContainer)
ptwOneValue->ItemType = TWTY_UINT16;
ptwOneValue->Item = TWPT_RGB;
TWAIN_Entry( DAT_CAPABILITY, MSG_SET,
      (TW_MEMREF)&twCapability, &m_SourceID);
```

Next, in a block 516, an edge detection algorithm is used to identify the external boundaries of the image. Typically, it is desired to acquire an image from a printed source image, such as a picture in a book. It is often the case that the picture in the book only occupies a portion of the maximum scanning area of the image acquisition device. The raw data produced by most image acquisition devices is in the form of a bitmap, either grayscale or color. Each pixel in the bitmap corresponds to a pixel in the scanned image. As a result, the number of pixels in the bitmap will depend on the size of the scanned image, and the selected resolution of the device. By using edge detection, the size of the scanned image can be reduced to the size of the source image itself (i.e., limit to the extents of the picture), rather than the entire scanning area of the device. Edge detection algorithms are well known in the art, and the specific algorithm employed in the present invention need not be discussed herein. The edge detection algorithm will not work on images that do not have well-defined boundaries, such as a page of text with a picture inset into the text.

Color and contrast/brightness correction are then performed using the bitmap data in a block 518. An algorithm based on well-known gamma table color correction techniques (not discussed here) is used to correct the color of the image. Color correction is not used if the device output data doesn't include color information. Additional well-known algorithms (not discussed here) are used to adjust the contrast and/or brightness of the captured image.

At this point, the image data are almost ready to be inserted into an application program document. The steps to complete the image acquisition process are performed in a block 520, which first saves the corrected bitmap data to a bitmap file in a temporary buffer. The bitmap file is then processed by a JPEG compression algorithm that stores the image in a compressed JPEG File Interchange Format (JFF) format in the buffer. JPEG compression greatly reduces the amount of data required to represent the image, while maintaining the quality of the original image. JPEG compression is well known in the art, and the algorithm for producing the JPEG output need not be discussed herein.

After the image has been converted into a compressed JPEG format, it is ready to be inserted into the application document. After the image is inserted into the document, the autoscan error flag is cleared in the registry to indicate that the autoscan operations (blocks 514, 516, 518, 520) were successful. As discussed above, if the autoscan operations are not successful, then the autoscan flag will not be reset. As a result, during the next attempted use of the device, the system will recognize that the devices error flag has not been cleared, and will set the device's autoscan error bit in the registry to disable autoscanning with the device.

In order to perform autoscanning, it is necessary to negotiate the capabilities of the image acquisition device prior to initiating the scanning process. Since it is desired that the autoscan option require minimal user input, the capabilities of the image acquisition device are preferably negotiated based on predetermined criteria. These criteria include a predetermined resolution and a predetermined JPEG compression level. The predetermined resolution will be dependant on the type of document that is being created. For instance, a different (lower) resolution is preferably employed for documents that are to be displayed on web pages, and a higher resolution is used for images in documents that are to be viewed in printed form.

The settings for the predetermined criteria and other parameters and flags are stored in the operating system registry. Rather than save these settings within each application (or each application document), the registry provides a central location for storing and retrieving this information. The following information is stored in the registry under the following key:

"HKEY_CURRENT_USER\\Software\\Microsoft\\Office\9.0\\Common\Scan."

TABLE 4

| Name | Value | Description |
| --- | --- | --- |
| DEVICEXX - XX from 0 to number of devices on system | TWAIN ID | Value as returned by TWAIN |
| FLAGSXX - XX from 0 to number of devices on system | FLAGS as defined below | Data from the IDS_DEVICE_XXX and/or as determined by the softwam |
| Device | TWAIN ID | Last device used |

TABLE 4-continued

| Name | Value | Description |
| --- | --- | --- |
| Resolution | High word - same as FLAGS<br>Low word - 0 = Web,<br>1 = Print | Flags for last device selected and last resolution selected |
| JPEGLEVEL | 70 | Nominal JPEG compression level |
| PRINTSCANRES | 150 | Nominal resolution for print scan |
| WEBSCANRES | 96 | Nominal resolution for web scan |

TABLE 5

| FLAGS Description | |
| --- | --- |
| CAN_AUTOSCAN = 1 | Enable "Insert" button |
| CAN_CUSTOMSCAN = 2 | Enable "Custom" button |
| CAN_WEB_RESOLUTION = 4 | Enable "Web" button |
| CAN_PRINT_RESOLUTION = 8 | Enable "Print" button |
| TRYING_AUTOSCAN = 16 | This bit is set before a "one button scan" is attempted. If there is a failure, the next time the device is selected, this bit is read and the "Insert" button is disabled for that device from then on by turning off the CAN_AUTOSCAN flag. If the scan is successful, the flag is reset |
| IS_A_CAMERA = 32 | Device is a camera |
| IS_A_FLATBED = 64 | Device is a flatbed scanner |
| IS_A_SHEETFED = 128 | Device is a sheetfed scanner |
| IS_AN_OTHER = 256 | Device is another |

Note that in a preferred embodiment, the predetermined resolution values are 150 DPI (dots per inch) for a printed document, and 96 DPI for a web page document. The JPEG compression level is also set at a 70% quality level.

In addition to the foregoing data, other data concerning various common image acquisition devices are stored as resources data in the MSOTW9.DLL. The format of this resource data are of the form:

IDS_DEVICE_XXX TWAIN ID DESCRIPTION NOAUTO(opt.)

IDS_DEVICE_XXX is the resource (image acquisition device) ID.

TWAIN ID is the name that TWAIN will send to the MSOTW9.DLL API when it queries the system for devices. Examples include the CANON™ IX-4025 and LOGITECH™ PageScan Color. The TWAIN ID may or may not be the same as the produce name (i.e., HEWLETT PACKARD™ Iicx Scanner), and several different devices may share one TWAIN ID.

The DESCRIPTION contains one of the following:

FLATBED—Flatbed scanner

SHEETFED—Sheetfed scanner

OTHERSCANNER—Other scanner

The NOAUTO entry is optional, and indicates whether or not autoscanning is supported by a given device.

Structure of the MSOTW9.DLL file

As discussed above, the TWAIN integration API is stored in a dynamic link library called MSOTW9.DLL. The MSOTW.DLL dynamic link library is composed of several component files and libraries, as shown in Table 6 below.

TABLE 6

| Component | Function |
| --- | --- |
| stdafx.cpp | Precompiled Header |
| acquire.cpp | Handles initialization and control of MSOTW9.dll and acquisition of image(s) from device |
| calcbrit.cpp | Contrast/Brightness adjustment |

TABLE 6-continued

| Component | Function |
| --- | --- |
| edge.cpp | Edge Detection |
| Filldata.cpp | Make .bmp file from TWAIN supplied image data |
| fmmx.cpp | Test for MMX capability |
| imgstats.cpp | Contrast/Brightness adjustment |
| matrifce.cpp | Contrast/Brightness adjustment |
| ScanDlg.cpp | MSOTW9.DLL User interface |
| ScanMgr.cpp | Top level interface to TWAIN wrapper class |
| Setting.cpp | Registry handler |
| Wrap.cpp | TWAIN wrapper class |
| msotw9.cpp | Main and utility functions |
| msotw9.def | Export symbols |
| msotw9.rc | Resources |
| Jpeg.lib | Static JPEG library built as part of OFFICE 2000 ™ |
| Nmfcutls.lib | Utility library |
| Tw9jpeg.lib | Interface to JPEG.lib |

The MSOTW9.DLL Entry

The MSOTW9.DLL API provides a single entry point using an AcquireImage( ) procedure call. The AcquireImage( ) call has the following format:

AcquireImage (IDispatch* ppAppl,
bool skipDialog,
OLECHAR* fileName,
int length)

The "Idispatch* ppAppl" parameter provides a pointer to the application that is calling the MSOTW9.DLL API. This parameter also identifies the application requesting API services, which is used when formatting the image data when the image is inserted into an application program document (see below). The "skipDialog" parameter is a Boolean value (TRUE or FALSE) that identifies whether the API should use or bypass the built-in user interface for a selected image acquisition device. The "OLECHAR* file- Name" parameter allows the application to specify a folder in which to save the image data This step is optional—in most cases the image data are simply inserted into a document without saving the image to a file or files. The "length" parameter is presently not used, but may be available for future use.

The AcquireImage( ) procedure call returns a TRUE or FALSE Boolean value. A return value of TRUE indicates that the procedure was successfully executed. A return value of FALSE indicates that there was a problem in the execution of the procedure.

Application Program Examples

Figure 10:
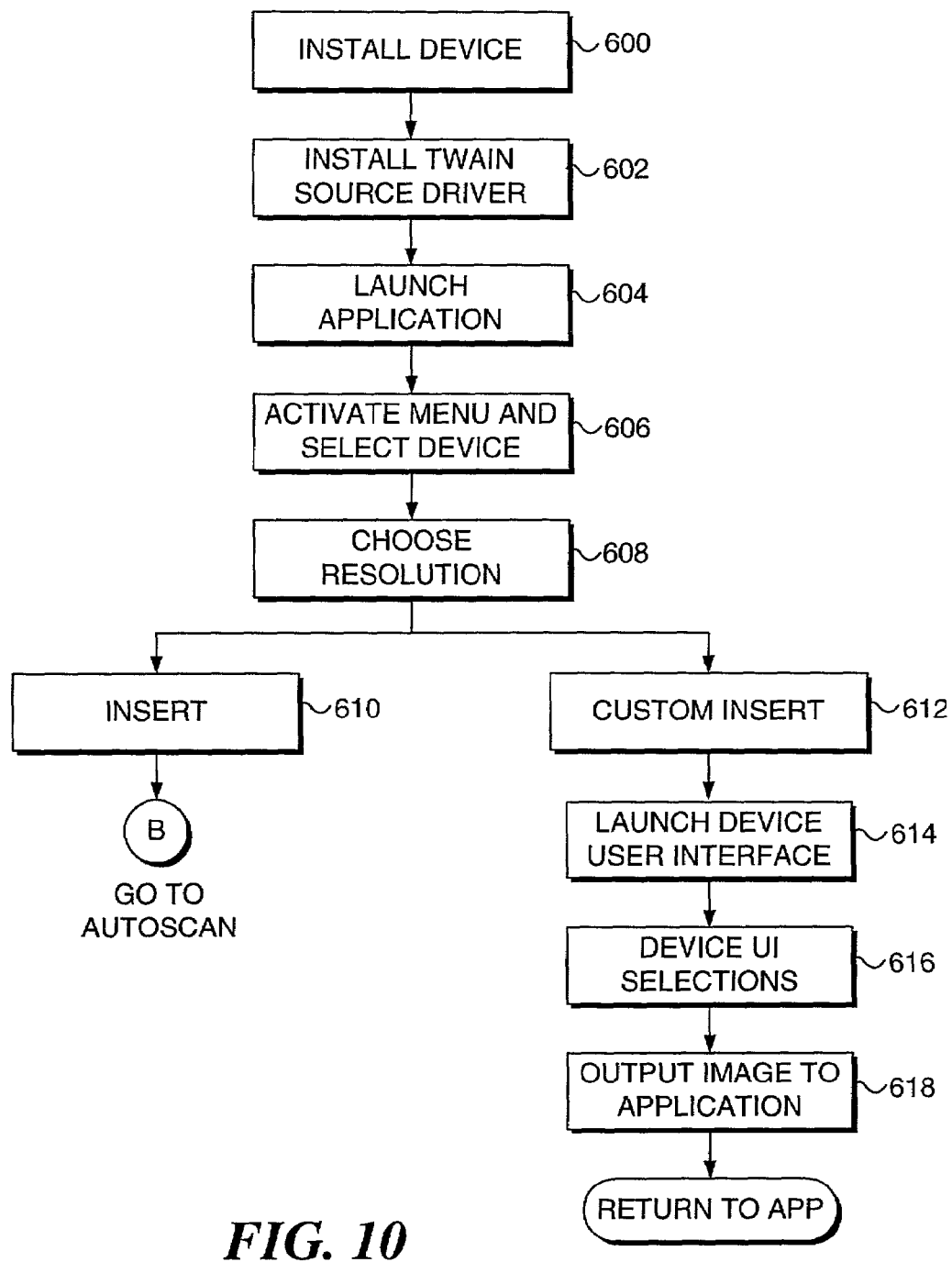
FIG. 10 is a flowchart illustrating the logic that an exemplary application program implementation of the invention performs when acquiring an image with a TWAIN image acquisition device.

FIG. 10 includes a flowchart describing the logical process that is used by an OFFICE 2000 application program, such as Microsoft Corporation's WORD 2000™, when inserting an image into a document using the MSOTW9.DLL API. In a block 600, a user installs the image acquisition device by attaching the device's communication cable to the user's computer via one of the computer's communication ports, such as a parallel, serial, USB port, Firewire port, or SCSI port, as appropriate. The user must also install the driver.ds device driver file for the device, or alternately, the driver.ds file may be included in a driver.dll library that is already installed on the computer (generally as part of the operating system). This step is performed in a block 602. The user may optionally install multiple image acquisition devices and drivers.

Figure 11A:
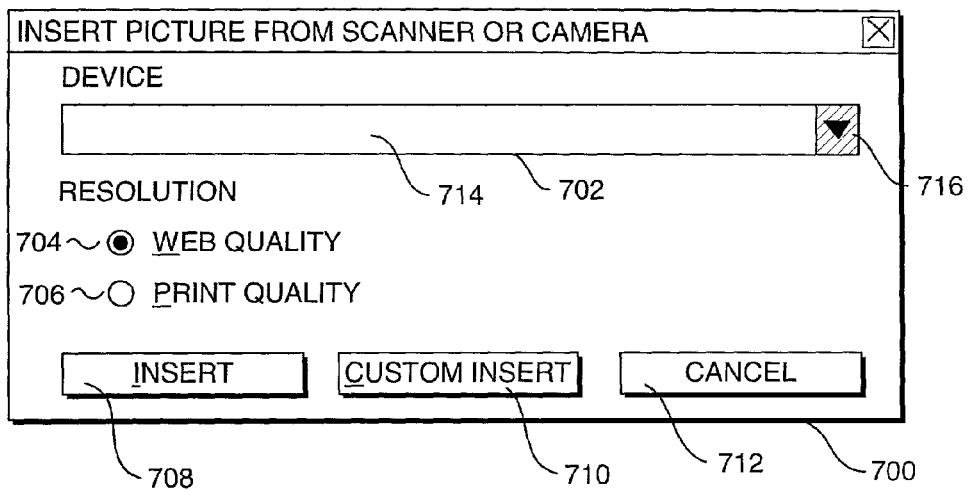
FIG. 11A is a dialog that is presented to a user at the start of the invention's image acquisition process.

Assuming that the device(s) and its driver(s) have been installed, the user launches the application program (e.g., the WORD 2000 word processing program) in a block 604, and initiates the image acquisition process by selecting "Insert->Picture->AcquireImage" from the application program's Insert drop-down menu. This step activates a selection dialog 700 as shown in FIG. 11A. The selection dialog comprises a drop-down menu selection control 702, a "Web Quality" radio button 704, a "Print Quality" radio button 706, an "Insert" button 708, a "Custom Insert" button 710, and a "Cancel" button 712. The drop-down menu control comprises a control field 714, an menu activation button 716, and a drop-down menu 718 (see FIG. 11B). The control field displays the image acquisition device that is presently selected for use.

Figure 11B:
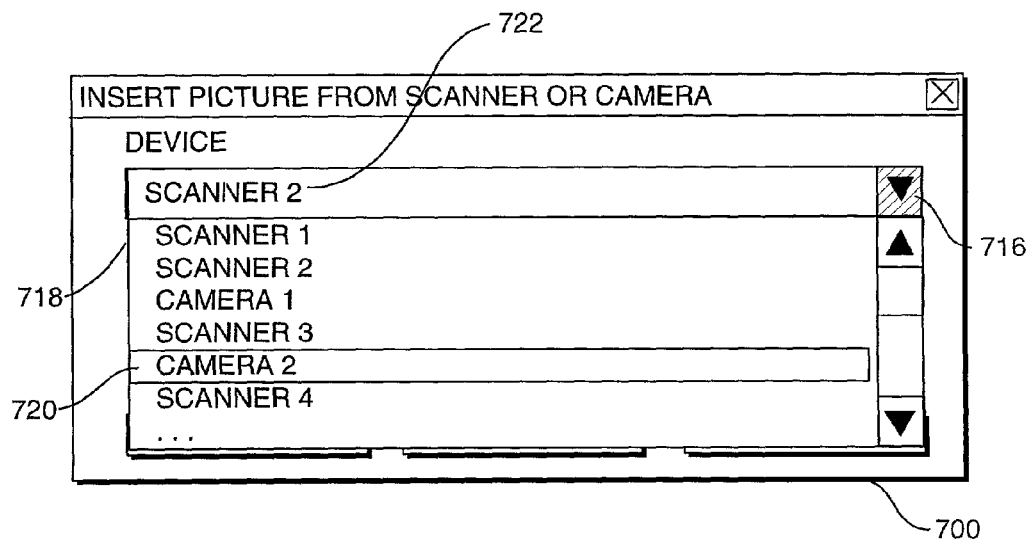
FIG. 11B is the dialog of FIG. 11A, showing activation of a drop-down menu listing different image acquisition devices available to a user.

As shown in FIG. 11B, activation of the menu activation button causes a drop-down menu to appear, providing a list of image acquisition devices that are available for use. The list of available devices (and their autoscanning capabilities) is generated by performing the process shown in the logic flowchart of FIG. 7, as discussed above. The user then selects one of the devices in the list (such as a camera 2 device 720 ), as shown by a block 606. When a user selects the "Acquire Image" menu option for the first time within a given WORD 2000 session, the control field will contain the name of the first device found. If this is not the first request to acquire an image during a session, then the control field will display the device that was used during the most recent image acquisition (such as a scanner 2 device 722 ), the identity of which is stored in the registry.

If the selected device supports autoscanning, the "Web Quality" and "Print Quality" radio buttons will be enabled, allowing the user to select a scanning resolution that can be used for autoscanning, as indicated by a block 608. (The "Web Quality" and "Print Quality" radio buttons will be disabled if the selected device does not support autoscanning.) The default setting for these radio buttons will correspond to the resolution that was used during the most recent image acquisition, which is stored in the registry.

These radio buttons represent a desired predefined image resolution. Selecting the "Web Quality" option causes a scanning device to autoscan an image at 96 DPI. Selecting the "Print Quality" option causes a scanning device to autoscan an image at 150 DPI.

At this point, the user may elect to automatically insert an image by activating the "Insert" button, or instead choose to insert an image using custom settings by activating the "Custom Insert" button. Optionally, the user may cancel the process by activating the "Cancel" button.

If the user activates the "Insert" button, the process flows to a block 610, which initiates the automatic scanning sequence shown in FIG. 9 at starting point B. An image is then automatically scanned with the selected image acquisition device and resolution, processed, and inserted into the active WORD 2000 document by using the autoscan process shown in FIG. 9, as described above, without requiring any further input from the user.

If the user desires to have more control over the image, or if the selected device does not support autoscanning (in which case the "Insert" button will be disabled), the user will select the "Custom Insert" button, corresponding to a block 612. The "Custom Insert" option allows a user to select customized image capture parameters for the image, such as pixel resolution (the radio button corresponding to the print quality setting in dialog 700 will be disregarded). The logic then proceeds to a block 614, which launches the selected device's built-in (Source) user interface dialog. The user can then set various image capture parameters, such as resolution, color or black and white, data format, etc, as indicated by a block 616. The image is then captured and output to the application in a block 618 based on the image capture parameters settings.

The insertion point of the captured image depends on the application that is being used. In WORD 2000, the image will be inserted so that its upper left-hand corner corresponds to the current cursor position when the process was initiated by the user. In EXCEL 2000™, the image will be inserted in the active cell of the active spreadsheet document. In POWERPOINT 2000™, the image will be inserted on the slide that is presently active. As discussed above, the MSOTW9.DLL API can determine which application program is using its services through the "Idispatch* ppAppl" parameter.

In the case where the selected image acquisition device is a digital camera, a plurality of images may be selected to be inserted into an application program document by choosing a digital camera as the image acquisition device and selecting the "Custom Image" option. Note that not all digital cameras support this feature. In order to select a plurality of images for insertion, it is necessary that the selected device's built-in user interface provide a scheme for selecting a plurality of images that are stored in the device. Such a user interface will typically comprise one or more dialogs that enable a user to select the images he or she wishes to acquire. For instance, the device's user interface may provide a dialog comprising a selection area displaying multiple thumbnail images representing all of the images that are stored in the digital camera or image database. The user chooses one or more images to be inserted into an application program document by selecting the thumbnails corresponding to those images, and then activating an interface control to indicate that the selection process is complete. Steps similar to those discussed above for inserting a single image are then performed, including converting the image data into a JPEG format and performing color and/or contrast/brightness correction. Since many digital cameras provide images that already have color and/or contrast/brightness correction, it may not be necessary to perform any postprocessing on images output from these devices prior to inserting the images into a document.

The way the plurality of images will be inserted into the document depends on the application program that is being used. For example, in WORD 2000. the images are inserted in a sequentially tiled fashion, based on the default order the image data are output from the digital camera. (The MDOTW 9.DLL module does not provide a means for controlling the order the images are output.) In EXCEL 2000. the images are inserted in a cascading fashion into the active cell of the active spreadsheet document. In POWERPOINT 2000, each of the captured images is inserted and preferably centered on a new separate slide.

Exemplary Operating Environment

Figure 12:
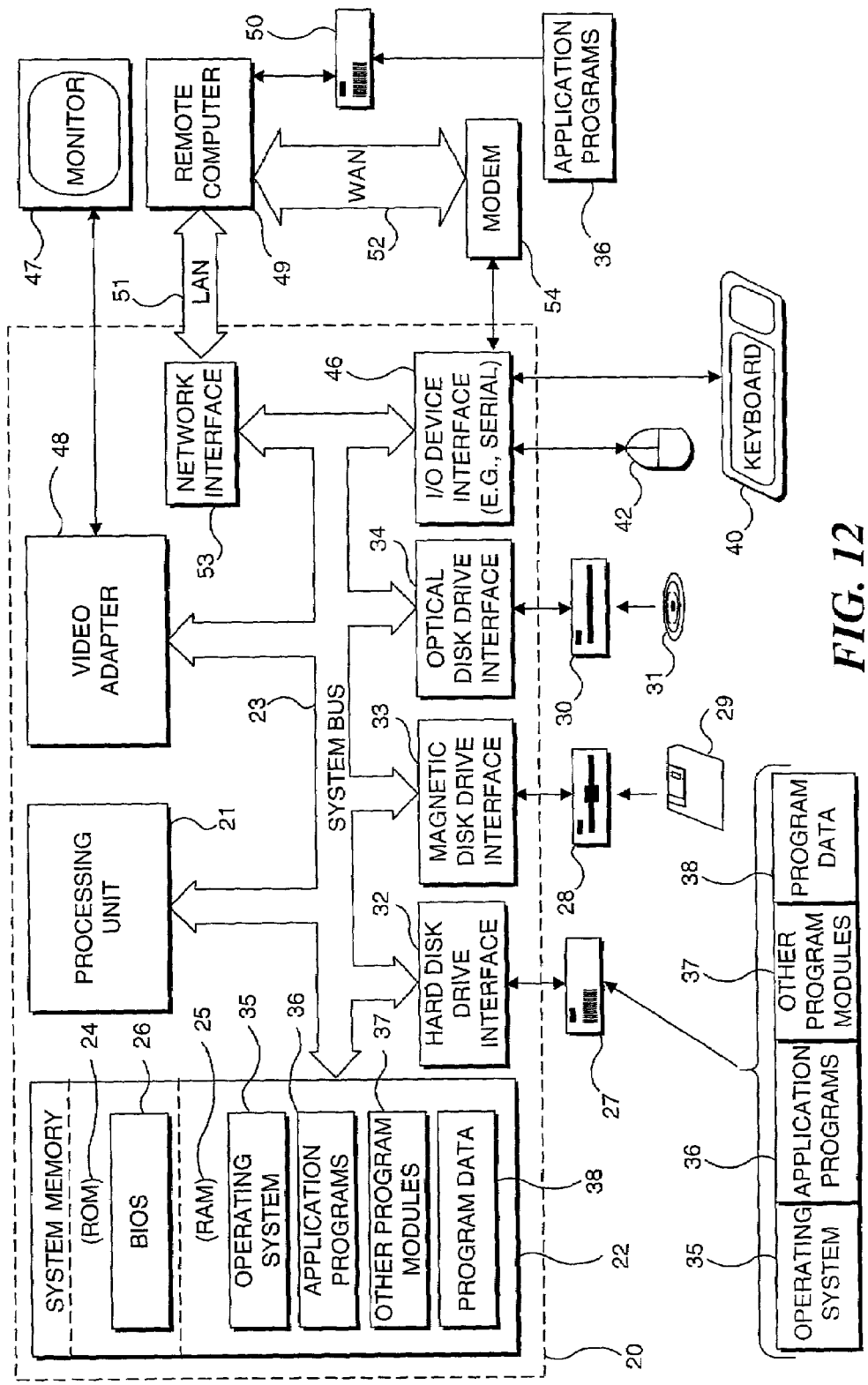
FIG. 12 is a schematic block diagram illustrating an exemplary computer system for practicing the present invention.

FIG. 12 and the following discussion are intended to provide a brief, general description of a suitable computing environment in which the invention may be implemented. The foregoing application programs (MICROSOFT WORD™, MICROSOFT EXCEL™, and MICROSOFT POWERPOINT™) and the dynamic link libraries (MSOTW9.DLL, TWAIN.DLL) and Source driver files (driver.ds files or.DLL file(s)) comprise a plurality of program modules that include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 12, an exemplary system for implementing the invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that helps to transfer information between elements within personal computer 20, such as during start-up, is stored in ROM 24. Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable instructions, data structures, program modules, and other data for personal computer 20. Although the exemplary environment described herein employs hard disk 27, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 27, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (ISB). A monitor 47 or other type of display device is also connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device, or other common network node, and typically includes many or all of the elements described above relative to personal computer 20, although only a memory storage device 50 has been illustrated in FIG. 12. The logical connections depicted in FIG. 12 include a local area network (LAN) 51 and a wide area network (WAN) 52. Such networking environments are commonplace in offices, enterprise wide computer networks, intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for inserting an image into a document stored in memory of a computer, comprising the steps of:
   (a) making an image source device active with an application program used to create a text content of said document, wherein the image source device is in communication with the computer and the computer is executing the application program;

(b) using a special application programming interface (API) module accessed from within the application program, for interfacing the application program with a TWAIN module that is used for acquiring an image with the image source device that is active, the special API module being entirely separate and distinct from the TWAIN module and providing a user interface that is presented to a user within and under control of the application program, said API module isolating a user from directly interacting with the TWAIN module and thereby simplifying the step of acquiring the image;

(c) causing the application program to employ the special API module for negotiating with the image source device that is active to determine a set of image capture parameters that control said image source device when acquiring the image; and (d) communicating data representing said image from the image source device into the memory of the computer so that the data representing said image comprises a portion of the document stored in the memory of the computer, all without saving said data to any permanent file prior to communicating the data into the document stored within the memory of the computer.

2. The method of claim 1, further comprising the steps of:
(a) creating a list of all image source devices in communication with the computer; and
(b) enabling a user to select the image source device that is active from the list.

3. The method of claim 1, wherein the active image source device comprises one of a scanner and a digital camera.

4. The method of claim 1, wherein the step of acquiring the image comprises the step of scanning a graphic source that has defined edges, further comprising the steps of automatically detecting the edges of the graphic source, and cropping the image at the edges of the graphic source to exclude any portion of a scanned field beyond the edges of the graphic source from the image represented by the data inserted into the document.

5. The method of claim 1, further comprising the step of converting the data representing the image into a compressed format prior to inserting the data into the document.

6. The method of claim 1, further including the steps of:
(a) selecting at least one image enhancement criterion from within the application program; and
(b) enhancing said captured image based on said image enhancement criterion, prior to inserting said data representing the image into said document.

7. The method of claim 6, wherein the image enhancement criterion is a contrast level of the image that is adjusted to enhance a brightness of the image within the document.

8. The method of claim 6, wherein the image enhancement criterion is a color level of the image that is adjusted to enhance a color relationship of the image inserted within the document, based on a gamma correction algorithm.

9. The method of claim 1, further comprising the step of determining a set of capabilities of the image source device that is active, wherein the set of image capture parameters are negotiated based in part on the capabilities of said image source device.

10. The method of claim 9, wherein a set of capabilities are associated with the image source devices connected with the computer and are stored in an operating system registry.

11. The method of claim 1, further comprising the step of using the special API module for determining from within the application program whether the image source device that is active is able to perform an automatic image scan, wherein the automatic image scan comprises the steps of capturing an image of a graphic source with said image source device and inserting the data representing the image into the document, all without requiring a user to select image capture parameters.

12. The method of claim 11, wherein the image source device that is active has an X resolution and a Y resolution and includes a driver that provides a user interface for selecting image capture parameters, the step of determining if said image source device can perform the automatic image scan comprising the steps of:
(a) confirming that said image source device can control its X resolution;
(b) confirming that said image source device can control its Y resolution; and
(c) confirming that the user interface of said image source device can be bypassed, wherein an affirmative answer to all of the steps of confirming indicates that said image source device can perform the automatic image scan.

13. The method of claim 11, wherein the step of determining if said image source device can perform the automatic image scan comprises the steps of:
(a) setting an error flag;
(b) attempting to perform an automatic image scan;
(c) clearing the error flag if the automatic image scan is successful; and
(d) evaluating the error flag during a subsequent use of the image source device, whereby if the error flag has not been cleared, the image source device cannot perform an automatic Image scan.

14. The method of claim 12, wherein if it is determined that said image source device can perform an automatic image scan, enabling a user of the application program to selectively cause the image to be acquired and the data representing the image to be inserted into the document, all with a single user control selection.

15. A computer-readable medium having computer-executable instructions for performing the steps recited in claim 1.

16. A computer-readable medium having computer-executable instructions for performing the steps recited in claim 11.

17. A method far inserting a plurality of images into a document stored in a memory of a computer, comprising the steps of:
(a) enabling an image source device user interface provided by a special application programming interface module from within an application program used to create a text content of the document, wherein the application program is running an the computer that is in communication with an image source device, said image source device acquiring multiple images and staring image source data representing the multiple images, wherein the special API module is entirely separate and distinct from a TWAIN module and interacts with the TWAIN module to control the image source device, and wherein the image source device user interface provides a selection scheme that is independent of the TWAIN module within the application program far selecting a plurality of the images stared in the image source device for insertion into the document;
(b) enabling a user to use the selection scheme of the image source device user interface from within the application program to select the plurality of images to be inserted into the document;

(c) transferring data representing the Images selected from the image source device, to the memory of the computer;

(d) converting said data representing the selected image into a compressed format; and (e) inserting said image data in the compressed format into the document stared in the memory of a computer so that the document includes the plurality of images without saving said image data in the compressed format to any permanent file prior to inserting the image data in the compressed format into the document stored in the memory of the computer.

18. The method of claim 17, wherein the application program is a word processing application, and the plurality of images are inserted into the document as a plurality of tiled images.

19. The method of claim 17, wherein the application program is a spreadsheet application that produces a spreadsheet document, and the plurality of inserted images are inserted into the spreadsheet document as a plurality of cascaded images.

20. The method of claim 17, wherein the application program is a presentation design application, and the plurality of inserted images are inserted into a presentation document as a plurality of individual slides.

21. The method of claim 17, further including the step of performing a postprocessing modification to said data from within the application program to enhance a quality of the plurality of images.

22. A computer-readable medium having computer-executable instructions for performing the steps recited in claim 17.

23. A system for inserting an image into a document, comprising:

(a) a computer having a memory and a processor, the memory storing:
  (i) machine instructions that are executable on the processor; and
  (ii) the document;

(b) an application program comprising the machine instructions that are stored in the memory, a text content of said document being editable using the application program;

(c) an image acquisition device connected in communication with the computer, to provide image data representing an image to the computer;

(d) a source driver module comprising computer-executable instructions stored in the memory and in communication with the image acquisition device so as to control acquisition of an image by the image acquisition device for transfer as the image data, into the memory of the computer;

(e) a source manager module comprising computer-executable instructions stored in the memory and in communication with the source driver module, the source manager module providing commands to the source driver module to acquire an image using the image acquisition device, such that the application program negotiates with the image acquisition device that is active to determine a set of image capture parameters that control said image source device when acquiring the image; and (f) an interface module comprising a special application programming interface (API) module defined by computer-executable instructions stored in the memory, the special API module being entirely separate and distinct from the source manager module and serving as an interface with the source manager module and under control of the application program, isolating a user from the source manager module and thereby simplifying acquisition of images for insertion into the document, the interface module providing commands to the source manager module to acquire an image using the image acquisition device, the interface module inserting the image data representing the image into the document that is stored in the memory of a computer without saving said image data to any permanent file prior to inserting the image data into the document stored in the memory of the computer.

24. The system of claim 23, wherein the application program is a word processing application.

25. The system of claim 23, wherein the application program is a spreadsheet application.

26. The system of claim 23, wherein the application program is a presentation design application.

27. The system of claim 23, wherein the source manager module complies with the TWAIN communication specification.

28. The system of claim 23, wherein the application program is able to request the interface module to acquire an image by issuing a single procedure call to the interface module.

29. The system of claim 23, wherein the application program provides a user interface that enables a user to acquire an image from the image acquisition device and insert the data representing the image into the application program document by selecting a single application menu option and performing a single subsequent user action.

30. The system of claim 23, wherein the interface module comprises additional computer-executable instructions for enhancing the quality of the captured image from within the application program, the captured image quality being enhanced prior to inserting the data representing the image into the application program document.

31. The system of claim 23, wherein the image is acquired by scanning a graphic source that has edges, and the interface module comprises additional computer-executable instructions for detecting the edges of the graphic source so as to automatically crop a scanned field to include only the portion of the scanned field included within the graphic source in the image, the image being so cropped prior to the data representing the image being inserted into the document.

32. The system of claim 23, wherein the interface module comprises additional computer-executable instructions for converting the data representing the image into a compressed format, said data being converted into the compressed format prior to being inserted into the document.

* * * * *